US011876295B2

(12) United States Patent
Taraschi et al.

(10) Patent No.: US 11,876,295 B2
(45) Date of Patent: Jan. 16, 2024

(54) ELECTROMAGNETIC REFLECTOR FOR USE IN A DIELECTRIC RESONATOR ANTENNA SYSTEM

(71) Applicant: Rogers Corporation, Chandler, AZ (US)

(72) Inventors: Gianni Taraschi, Arlington, MA (US); Kristi Pance, Auburndale, MA (US); Shawn P. Williams, Andover, MA (US); Karl E. Sprentall, Medford, MA (US); Stephen O'Connor, West Roxbury, MA (US); Murali Sethumadhavan, Acton, MA (US); Michael S. White, Pomfret Center, CT (US)

(73) Assignee: ROGERS CORPORATION, Chandler, AZ (US)

( * ) Notice: Subject to any disclaimer, the term of this patent is extended or adjusted under 35 U.S.C. 154(b) by 726 days.

(21) Appl. No.: 15/957,078

(22) Filed: Apr. 19, 2018

(65) Prior Publication Data

US 2019/0123448 A1 Apr. 25, 2019

Related U.S. Application Data

(60) Provisional application No. 62/569,051, filed on Oct. 6, 2017, provisional application No. 62/500,065, filed on May 2, 2017.

(51) Int. Cl.

| | |
|---|---|
| ***H01Q 9/04*** | (2006.01) |
| ***H01Q 15/14*** | (2006.01) |
| ***H01Q 21/00*** | (2006.01) |

(52) U.S. Cl.
CPC .......... *H01Q 15/14* (2013.01); *H01Q 9/0485* (2013.01); *H01Q 21/0087* (2013.01)

(58) Field of Classification Search
CPC ... H01Q 15/14; H01Q 9/0485; H01Q 21/0087
See application file for complete search history.

(56) References Cited

U.S. PATENT DOCUMENTS 2,624,002 A 10/1952 Bouix
3,212,454 A 10/1965 Ringenbach
(Continued)

FOREIGN PATENT DOCUMENTS

EP 0468413 A2 * 1/1992 .......... H01Q 21/065
EP 0587247 A1 3/1994
(Continued)

OTHER PUBLICATIONS

Nasimuddin et al., "Antennas with dielectric resonators and surface mounted short horns for high gain and large bandwidth," IET Microwaves Antennas & Propagation, July (Year: 2007).*
(Continued)

*Primary Examiner* — Dimary S Lopez Cruz
*Assistant Examiner* — Bamidele A Immanuel
(74) *Attorney, Agent, or Firm* — CANTOR COLBURN LLP

(57) ABSTRACT

An electromagnetic device includes: an electromagnetically reflective structure having an electrically conductive structure and a plurality of electrically conductive electromagnetic reflectors that are integrally formed with or are in electrical communication with the electrically conductive structure; wherein the plurality of reflectors are disposed relative to each other in an ordered arrangement; and, wherein each reflector of the plurality of reflectors forms a wall that defines and at least partially circumscribes a recess having an electrically conductive base that forms part of or is in electrical communication with the electrically conductive structure.

19 Claims, 19 Drawing Sheets

(56) References Cited

U.S. PATENT DOCUMENTS 3,321,765 A 5/1967 Peters et al.
4,366,484 A 12/1982 Weiss et al.
4,743,915 A * 5/1988 Rammos .............. H01Q 21/064 343/776
5,071,359 A * 12/1991 Arnio ..................... B23K 26/40 439/91
5,227,749 A 7/1993 Raguenet et al.
5,453,754 A * 9/1995 Fray ..................... H01Q 9/0485 343/873
5,589,842 A 12/1996 Wang et al.
5,667,796 A 9/1997 Otten
5,767,808 A * 6/1998 Robbins ............... H01Q 9/0407 343/700 MS
5,825,271 A 10/1998 Stitzer
5,854,608 A 12/1998 Leisten
5,867,120 A 2/1999 Ishikawa et al.
5,940,036 A 8/1999 Oliver et al.
5,952,972 A 9/1999 Ittipiboon et al.
6,031,433 A 2/2000 Tanizaki et al.
6,052,087 A 4/2000 Ishikawa et al.
6,061,026 A * 5/2000 Ochi .................... H01Q 21/064 343/786
6,061,031 A 5/2000 Cosenza et al.
6,075,485 A 6/2000 Lilly et al.
6,147,647 A 11/2000 Tassoudji et al.
6,181,297 B1 1/2001 Leisten
6,188,360 B1 2/2001 Kato et al.
6,198,450 B1 3/2001 Adachi et al.
6,268,833 B1 7/2001 Tanizaki et al.
6,292,141 B1 9/2001 Lim
6,314,276 B1 11/2001 Hilgers et al.
6,317,095 B1 11/2001 Teshirogi et al.
6,323,808 B1 11/2001 Heinrichs et al.
6,323,824 B1 11/2001 Heinrichs et al.
6,344,833 B1 2/2002 Lin et al.
6,373,441 B1 4/2002 Porath et al.
6,437,747 B1 8/2002 Stoiljkovic et al.
6,476,774 B1 11/2002 Davidson et al.
6,528,145 B1 3/2003 Berger et al.
6,552,687 B1 4/2003 Rawnick et al.
6,556,169 B1 4/2003 Fukuura et al.
6,621,381 B1 9/2003 Kundu et al.
6,743,744 B1 6/2004 Kim et al.
6,794,324 B1 9/2004 Kim et al.
6,816,118 B2 11/2004 Kingsley et al.
6,816,128 B1 11/2004 Jennings
7,161,535 B2 1/2007 Palmer et al.
7,179,844 B2 2/2007 Aki et al.
7,183,975 B2 2/2007 Thomas et al.
7,196,663 B2 3/2007 Bozer et al.
7,253,789 B2 8/2007 Kingsley et al.
7,279,030 B2 10/2007 Kurowski
7,292,204 B1 11/2007 Chang et al.
7,310,031 B2 12/2007 Pance et al.
7,379,030 B1 5/2008 Lier
7,382,322 B1 6/2008 Yang et al.
7,405,698 B2 7/2008 De Rochemont
7,443,363 B2 10/2008 Ying
7,498,969 B1 3/2009 Paulsen et al.
7,545,327 B2 6/2009 Iellici et al.
7,570,219 B1 8/2009 Paulsen et al.
7,595,765 B1 9/2009 Hirsch et al.
7,636,063 B2 12/2009 Channabasappa
7,663,553 B2 2/2010 Chang et al.
7,710,325 B2 5/2010 Cheng
7,835,600 B1 11/2010 Yap et al.
7,876,283 B2 1/2011 Bouche et al.
7,961,148 B2 6/2011 Goldberger
8,018,397 B2 9/2011 Jow et al.
8,098,197 B1 1/2012 Herting et al.
8,497,804 B2 7/2013 Haubrich et al.
8,498,539 B1 7/2013 Ilchenko et al.
8,736,502 B1 5/2014 Langfield et al.
8,773,319 B1 7/2014 Anderson et al.
8,902,115 B1 12/2014 Loui et al.
9,112,273 B2 8/2015 Christie et al.
9,184,697 B2 11/2015 Sekiguchi et al.
9,225,070 B1 12/2015 Zeweri et al.
9,455,488 B2 9/2016 Chirila
9,608,330 B2 3/2017 Singleton et al.
9,825,373 B1 11/2017 Smith
9,917,044 B2 3/2018 Zhou et al.
9,930,668 B2 3/2018 Barzegar et al.
10,355,361 B2 7/2019 Pance et al.
10,476,164 B2 11/2019 Pance et al.
10,522,917 B2 12/2019 Pance et al.
10,587,039 B2 3/2020 Pance et al.
10,601,137 B2 3/2020 Pance et al.
2001/0013842 A1 8/2001 Ishikawa et al.
2001/0043158 A1 11/2001 Adachi et al.
2002/0000947 A1 1/2002 Al-Rawi et al.
2002/0057138 A1 5/2002 Takagi et al.
2002/0180646 A1 12/2002 Kivekas et al.
2002/0196190 A1 12/2002 Lim
2003/0016176 A1 1/2003 Kingsley et al.
2003/0034922 A1 2/2003 Isaacs et al.
2003/0043075 A1 3/2003 Bit-Babik et al.
2003/0122729 A1 7/2003 Diaz et al.
2003/0151548 A1* 8/2003 Kingsley .................. H01Q 3/24 342/368
2003/0181312 A1 9/2003 Mailadil et al.
2004/0029709 A1 2/2004 Oba et al.
2004/0036148 A1 2/2004 Block et al.
2004/0051602 A1 3/2004 Pance et al.
2004/0080455 A1 4/2004 Lee
2004/0113843 A1 6/2004 Le Bolzer et al.
2004/0119646 A1 6/2004 Ohno et al.
2004/0127248 A1 7/2004 Lin et al.
2004/0130489 A1 7/2004 Le Bolzer et al.
2004/0155817 A1 8/2004 Kingsley et al.
2004/0233107 A1 11/2004 Popov et al.
2004/0257176 A1 12/2004 Pance et al.
2004/0263422 A1 12/2004 Lynch
2005/0017903 A1 1/2005 Ittipiboon et al.
2005/0024271 A1 2/2005 Ying et al.
2005/0057402 A1* 3/2005 Ohno ................. H01Q 21/0075 343/700 MS
2005/0099348 A1 5/2005 Pendry
2005/0122273 A1 6/2005 Legay et al.
2005/0162316 A1 7/2005 Thomas et al.
2005/0162733 A1 7/2005 Cho et al.
2005/0179598 A1 8/2005 Legay et al.
2005/0200531 A1* 9/2005 Huang ................. H01Q 19/026 343/893
2005/0219130 A1 10/2005 Koch et al.
2005/0225499 A1 10/2005 Kingsley et al.
2005/0242996 A1 11/2005 Palmer et al.
2005/0264449 A1 12/2005 Strickland
2005/0264451 A1 12/2005 Aikawa et al.
2005/0264452 A1* 12/2005 Fujishima ................ H01Q 1/48 343/700 MS
2006/0022875 A1 2/2006 Pidwerbetsky et al.
2006/0119518 A1 6/2006 Ohmi et al.
2006/0145705 A1 7/2006 Raja
2006/0194690 A1 8/2006 Osuzu
2006/0220958 A1 10/2006 Saegrov
2006/0232474 A1 10/2006 Fox
2006/0293651 A1 12/2006 Cronin
2007/0152884 A1 7/2007 Bouche et al.
2007/0164420 A1 7/2007 Chen et al.
2007/0252778 A1 11/2007 Ide et al.
2008/0036675 A1 2/2008 Fujieda
2008/0042903 A1 2/2008 Cheng
2008/0048915 A1 2/2008 Chang et al.
2008/0079182 A1 4/2008 Thompson et al.
2008/0094309 A1 4/2008 Pance et al.
2008/0122703 A1 5/2008 Ying
2008/0129616 A1 6/2008 Li et al.
2008/0129617 A1 6/2008 Li et al.
2008/0193749 A1 8/2008 Thompson et al.
2008/0260323 A1 10/2008 Jalali et al.
2008/0272963 A1 11/2008 Chang et al.
2008/0278378 A1 11/2008 Chang et al.

(56) References Cited

U.S. PATENT DOCUMENTS

2009/0040131 A1 2/2009 Mosallaei
2009/0073332 A1 3/2009 Irie
2009/0102739 A1* 4/2009 Chang .................. H01Q 1/2291 343/846
2009/0128262 A1 5/2009 Lee et al.
2009/0128434 A1 5/2009 Chang et al.
2009/0140944 A1 6/2009 Chang et al.
2009/0153403 A1 6/2009 Chang et al.
2009/0179810 A1 7/2009 Kato et al.
2009/0184875 A1 7/2009 Chang et al.
2009/0206957 A1 8/2009 Hiroshima et al.
2009/0262022 A1 10/2009 Ying
2009/0270244 A1 10/2009 Chen et al.
2009/0305652 A1 12/2009 Boffa et al.
2010/0002312 A1 1/2010 Duparre et al.
2010/0051340 A1 3/2010 Yang et al.
2010/0065314 A1* 3/2010 Lin ...................... H05K 3/4661 174/258
2010/0103052 A1 4/2010 Ying
2010/0156754 A1 6/2010 Kondou
2010/0215840 A1* 8/2010 Grunwald .............. H05K 3/244 427/96.2
2010/0220024 A1 9/2010 Snow et al.
2010/0231452 A1 9/2010 Babakhani et al.
2010/0309089 A1* 12/2010 Collinson ................ H01Q 1/42 343/872
2011/0040300 A1* 2/2011 Brannan ............ A61B 18/1815 606/41
2011/0050367 A1 3/2011 Yen et al.
2011/0121258 A1 5/2011 Hanein et al.
2011/0122036 A1 5/2011 Leung et al.
2011/0133991 A1 6/2011 Lee et al.
2011/0204531 A1 8/2011 Hara et al.
2011/0248890 A1 10/2011 Lee et al.
2012/0045619 A1 2/2012 Ando et al.
2012/0092219 A1 4/2012 Kim
2012/0212386 A1 8/2012 Massie et al.
2012/0242553 A1 9/2012 Leung et al.
2012/0245016 A1 9/2012 Curry et al.
2012/0256796 A1* 10/2012 Leiba ....................... H01Q 9/38 343/781 R
2012/0274523 A1 11/2012 Ayatollahi
2012/0276311 A1 11/2012 Chirila
2012/0280380 A1* 11/2012 Kamgaing ......... H01Q 21/0093 343/893
2012/0287008 A1 11/2012 Kim
2012/0306713 A1 12/2012 Raj et al.
2012/0329635 A1 12/2012 Hill
2013/0076570 A1 3/2013 Lee et al.
2013/0088396 A1 4/2013 Han
2013/0113674 A1 5/2013 Ryu
2013/0120193 A1 5/2013 Hoppe et al.
2013/0234898 A1 9/2013 Leung et al.
2013/0278610 A1* 10/2013 Stephanou .............. H01P 1/208 345/501
2014/0043189 A1 2/2014 Lee et al.
2014/0091103 A1 4/2014 Neitzel
2014/0327591 A1 11/2014 Kokkinos
2014/0327597 A1 11/2014 Rashidian et al.
2015/0035714 A1 2/2015 Zhou
2015/0077198 A1 3/2015 Yatabe
2015/0138036 A1 4/2015 Harper
2015/0183167 A1 7/2015 Molinari et al.
2015/0207233 A1 7/2015 Kim et al.
2015/0207234 A1 7/2015 Ganchrow et al.
2015/0236428 A1 8/2015 Caratelli et al.
2015/0244082 A1 8/2015 Caratelli et al.
2015/0266244 A1 9/2015 Page
2015/0303546 A1 10/2015 Rashidian et al.
2015/0314526 A1 11/2015 Cohen
2015/0346334 A1 12/2015 Nagaishi et al.
2015/0380824 A1 12/2015 Tayfeh Aligodarz et al.
2016/0006118 A1* 1/2016 Maruyama ............. H01Q 13/18 343/702
2016/0107290 A1 4/2016 Bajaj et al.
2016/0111769 A1* 4/2016 Pance ........................ H01P 7/10 333/202
2016/0218437 A1 7/2016 Guntupalli et al.
2016/0294066 A1 10/2016 Djerafi et al.
2016/0294068 A1 10/2016 Djerafi et al.
2016/0313306 A1 10/2016 Ingber et al.
2016/0314431 A1 10/2016 Quezada
2016/0322708 A1* 11/2016 Tayfeh Aligodarz ........................ H01Q 9/0485
2016/0351996 A1* 12/2016 Ou ......................... H01Q 1/241
2016/0372955 A1 12/2016 Fackelmeier et al.
2017/0018851 A1 1/2017 Henry et al.
2017/0040700 A1 2/2017 Leung et al.
2017/0069958 A1* 3/2017 Ko ......................... H01Q 1/243
2017/0125901 A1 5/2017 Sharawi et al.
2017/0125908 A1 5/2017 Pance et al.
2017/0125909 A1 5/2017 Pance et al.
2017/0125910 A1 5/2017 Pance et al.
2017/0179569 A1 6/2017 Kim et al.
2017/0188874 A1 7/2017 Suhami
2017/0201026 A1 7/2017 Werner et al.
2017/0225395 A1 8/2017 Boydston et al.
2017/0256847 A1 9/2017 Vollmer et al.
2017/0271772 A1 9/2017 Miraftab et al.
2017/0272149 A1 9/2017 Michaels
2018/0054234 A1 2/2018 Stuckman et al.
2018/0069594 A1 3/2018 Henry et al.
2018/0090815 A1* 3/2018 Shirinfar ................ H01Q 1/246
2018/0115072 A1 4/2018 Pance et al.
2018/0183150 A1* 6/2018 Sienkiewicz .......... H01Q 21/00
2018/0241129 A1* 8/2018 Pance ................ H01Q 21/0075
2018/0309202 A1 10/2018 Pance et al.
2018/0323514 A1 11/2018 Pance et al.
2019/0020105 A1 1/2019 Pance et al.
2019/0128624 A1 5/2019 Cohen et al.
2019/0214732 A1 7/2019 Leung et al.
2019/0221926 A1 7/2019 Pance et al.
2019/0221939 A1 7/2019 George et al.
2019/0221940 A1 7/2019 Pance et al.
2019/0319357 A1 10/2019 Pance et al.
2019/0319358 A1 10/2019 Pance et al.
2019/0379123 A1 12/2019 Leung et al.
2019/0393607 A1 12/2019 Pance et al.
2020/0083602 A1 3/2020 Sethumadhavan et al.
2020/0083609 A1 3/2020 Pance et al.
2020/0099136 A1 3/2020 Pance et al.
2020/0194881 A1 6/2020 Pance et al.
2020/0227827 A1 7/2020 Vollmer et al.

FOREIGN PATENT DOCUMENTS

EP 0801436 A2 10/1997
EP 1783516 A1 5/2007
EP 2905632 A1 8/2015
GB 2050231 A 1/1981
JP 2004112131 A 4/2004
JP 2011195444 A * 10/2011 ............... H01G 4/12
WO 2017075184 A1 5/2017

OTHER PUBLICATIONS

Buerkle, A. et al; "Fabrication of a DRA Array Using Ceramic Stereolithography"; IEEE Antennas and Wireless Popagation Letters; IEEE; vol. 5,, No. 1, Jan. 2007; pp. 479-481.
Zainud-Deen, S H et al; "Dielectric Resonator Antenna Phased Array for Fixed RFID Reader in Near Field Region", IEEE; Mar. 6, 2012; pp. 102-107.
Guo, Yomg-Xin, et al.,; "Wide-Band Stacked Double Annular-Ring Dielectric Resonator Antenna at the End-Fire Mode Operation"; IEEE Transacions on Antennas and Propagation; vol. 53; No. 10; 2005; 3394-3397 pages.
Kakade, A.B., et al; "Analysis of the Rectangular Waveguide Slot Coupled Multilayer hemispherical Dielectric Resonator Antenna"; IET Microwaves, Antennas & Propagation, The Institution of Engineering and Technology; vol. 6; No. 3; 2012; 338-347 pages.

(56) References Cited

OTHER PUBLICATIONS

Kishk, A. Ahmed, et al.,; "Analysis of Dielectric-Resonator with Emphasis on Hemispherical Structures"; IEEE Antennas & Propagation Magazine; vol. 36; No. 2; 1994; 20-31 pages.

Notification of Transmittal of the International Search Report and the Wrritten Opinion of the International Searching Authority, or the Declaration for International Application No. PCT/US2018/029003 dated Jul. 6, 2018 and dated Jul. 9, 2018, which is related to U.S. Appl. No. 15/957,078; 1-6 pages.

Petosa, Aldo, et al.; "Dielectric Resonator Antennas: A Historical Review and the Current State of the Art"; IEEE Antennas and Propagation Magazine; vol. 52, No. 5, Oct. 2010; 91-116 pages.

Ruan, Yu-Feng, et al; "Antenna Effects Consideration for Space-Time Coding UWB-Impulse Radio System in IEEE 802.15 Multipath Channel"; Wireless Communications, Networking and Mobile Computing; 2006; 1-4 pages.

Wong, Kin-Lu, et al.,; "Analysis of a Hemispherical Dielectric Resonator Antenna with an Airgap"; IEEE Microwave and Guided Wave Letters; vol. 3; No. 9; 1993; 355-357 pages.

Written Opinion of the International Searching Authority for International Application No. PCT/US2018/029003 dated Jul. 6, 2018 and dated Jul. 9, 2018, which is related to U.S. Appl. No. 15/957,078; 1-14 pages.

Kakade, Anandrao, et al.; Mode Excitation in the Coaxial Probe Coupled Three-Layer Hemispherical Dielectric Resonator Antenna; IEEE Transactions on Antennas and Propagation; vol. 59; No. 12; Dec. 2011; 7 pages.

Raghvendra Kumar Chaudhary et al; Variation of Permittivity in Radial Direction in Concentric Half-Split Cylindrical Dielectric Resonator Antenna for Wideband Application: Permittivity Variation in R-Dir. in CDRA; International Journal of RF and Microwave Computer-Aided Engineering; vol. 25; No. 4; May 1, 2015; pp. 321-329.

Zhang Shiyu et al.; "3D-Printed Graded Index Lenses for RF Applications"; ISAP 2016 International Symposium on Antennas and Propagation, Okinawa, Japan.; pp. 1-27.

* cited by examiner

ELECTROMAGNETIC REFLECTOR FOR USE IN A DIELECTRIC RESONATOR ANTENNA SYSTEM

CROSS REFERENCE TO RELATED APPLICATIONS

This application claims the benefit of U.S. Provisional Application Ser. No. 62/569,051, filed Oct. 6, 2017, which is incorporated herein by reference in its entirety. This application also claims the benefit of U.S. Provisional Application Ser. No. 62/500,065, filed May 2, 2017, which is incorporated herein by reference in its entirety.

BACKGROUND OF THE INVENTION

The present disclosure relates generally to an electromagnetic device, particularly to an electromagnetically reflective structure for use in a dielectric resonator antenna (DRA) system, and more particularly to a monolithic electromagnetically reflective structure for use in a DRA system, which is well suited for microwave and millimeter wave applications.

While existing DRA resonators and arrays may be suitable for their intended purpose, the art of DRAs would be advanced with an electromagnetic device useful for building a high gain DRA system with high directionality in the far field that can overcome existing drawbacks, such as limited bandwidth, limited efficiency, limited gain, limited directionality, or complex fabrication techniques, for example.

BRIEF DESCRIPTION OF THE INVENTION

An embodiment includes an electromagnetic device, having: an electromagnetically reflective structure comprising an electrically conductive structure and a plurality of electrically conductive electromagnetic reflectors that are integrally formed with or are in electrical communication with the electrically conductive structure; wherein the plurality of reflectors are disposed relative to each other in an ordered arrangement; and, wherein each reflector of the plurality of reflectors forms a wall that defines and at least partially circumscribes a recess having an electrically conductive base that forms part of or is in electrical communication with the electrically conductive structure.

The above features and advantages and other features and advantages of the invention are readily apparent from the following detailed description of the invention when taken in connection with the accompanying drawings.

BRIEF DESCRIPTION OF THE DRAWINGS

Referring to the exemplary non-limiting drawings wherein like elements are numbered alike in the accompanying Figures.

DETAILED DESCRIPTION OF THE INVENTION

Although the following detailed description contains many specifics for the purposes of illustration, anyone of ordinary skill in the art will appreciate that many variations and alterations to the following details are within the scope of the claims. Accordingly, the following example embodiments are set forth without any loss of generality to, and without imposing limitations upon, the claimed invention.

Embodiments disclosed herein include different arrangements for an electromagnetic (EM) device useful for building a high gain DRA system with high directionality in the far field. An embodiment of an EM device as disclosed herein includes one or more unitary EM reflective structures having an electrically conductive structure that may serve as an electrical ground structure, and one or more electrically conductive EM reflectors that are integrally formed with or are in electrical communication with the electrically conductive structure.

An embodiment of an EM device as disclosed herein includes one or more DRAs disposed within respective ones of the one or more electrically conductive EM reflectors to provide an EM device in the form of a high gain DRA system.

As used herein, the term unitary means a single arrangement of one or more constituents that are self-supporting with respect to each other, may be joined by any means suitable for a purpose disclosed herein, and may be separable with or without damaging the one or more constituents.

As used herein, the phrase one-piece structure means a single arrangement of one or more constituents that are self-supporting with respect to each other, having no constituent that can be completely separated from another of the one or more constituents during normal use, and having no constituent that can be completely separated from another of the one or more constituents without destroying or damaging some portion of any associated constituent.

As used herein, the phrase integrally formed means a structure formed with material common to the rest of the structure absent material discontinuities from one region of the structure to another, such as a structure produced from a plastic molding process, a 3D printing process, a deposition process, or a machined or forged metal-working process, for example. Alternatively, integrally formed means a unitary one-piece indivisible structure.

As used herein, the term monolithic means a structure integrally formed from a single material composition.

Figure 1:
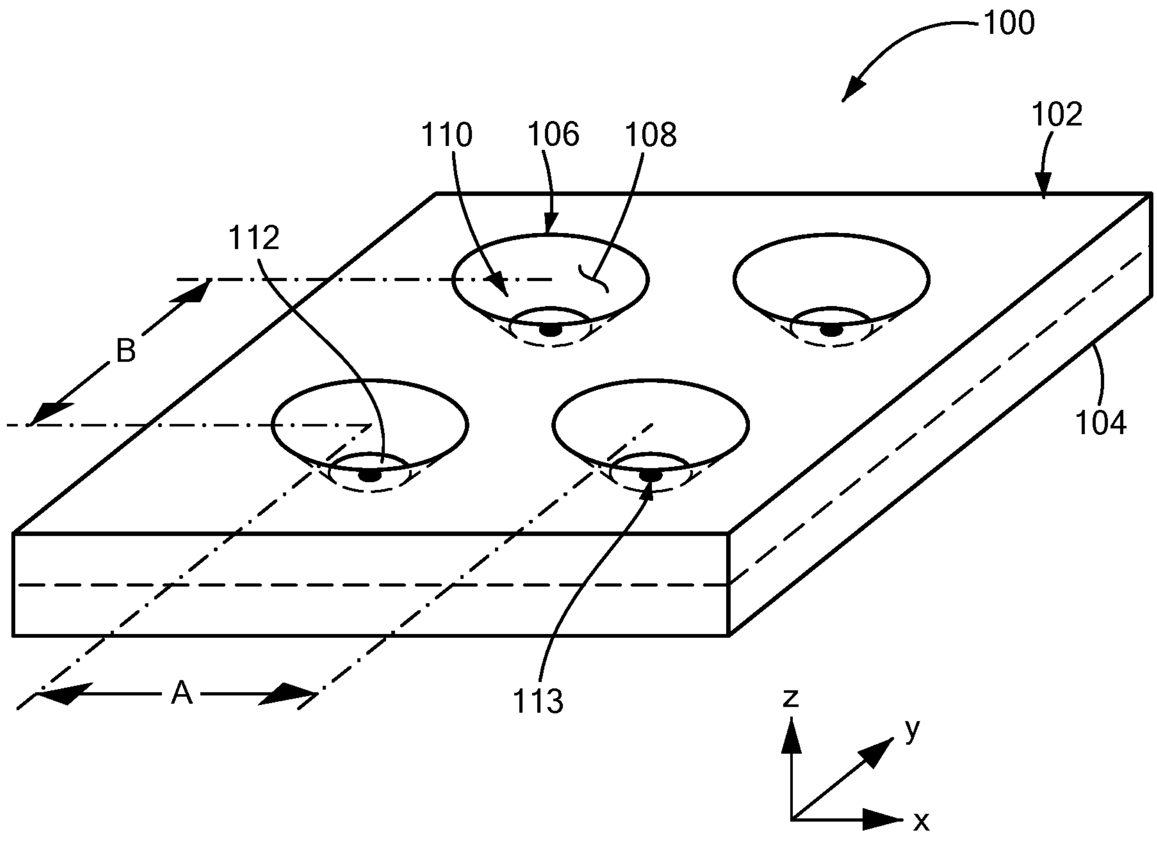
FIG. 1 depicts a rotated isometric view of an example electromagnetic (EM) device, in accordance with an embodiment.

With reference now to FIG. 1, an embodiment of an EM device 100 includes a unitary electromagnetically reflective structure 102 having an electrically conductive structure 104 and a plurality of electrically conductive electromagnetic reflectors 106 that are integrally formed with or are in electrical communication with the electrically conductive structure 104. The plurality of reflectors 106 are disposed relative to each other in an ordered arrangement, where each reflector of the plurality of reflectors 106 forms a wall 108 that defines and at least partially circumscribes a recess 110 having an electrically conductive base 112 that forms part of or is in electrical communication with the electrically conductive structure 104, and where the electrically conductive base 112 includes a feed structure 113 configured to receive an electromagnetic signal. In an embodiment, the electrically conductive structure 104 is configured to provide an electrical ground reference voltage of the EM device 100. While FIG. 1 depicts the walls 108 having a truncated conical shape (angled wall relative to the z-axis), the scope of the invention is not so limited, as the walls 108 of the reflectors 106 may be vertical relative to the z-axis (best seen with reference to FIGS. 3-6).

In an embodiment, the unitary electromagnetically reflective structure 102 is a monolithic structure formed from a single material composition absent macroscopic seams or joints. However, and as will be described further herein below, embodiments of the invention are not limited to such a monolithic structure.

While FIG. 1 depicts a two-by-two array of reflectors 106, it will be appreciated that this is for illustration purposes only and that the scope of the invention is not limited to only a two-by-two array. As such, it will be appreciated that FIG. 1 is representative of any number of reflectors of a unitary electromagnetically reflective structure consistent with the disclosure herein, including multiple reflectors of any number and in any array arrangement, or a single reflector.

Figure 2A:
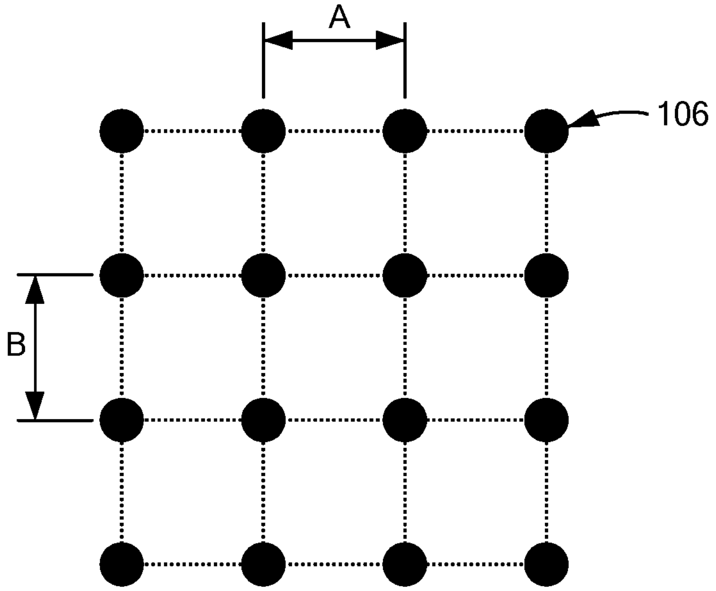
FIGS. 2A, 2B, 2C, 2D, 2E, 2F and 2G depict alternative schematics of a plurality of reflectors of the EM device of FIG. 1 arranged in an array with an ordered center-to-center spacing between neighboring reflectors, in accordance with an embodiment.
Figure 2B:
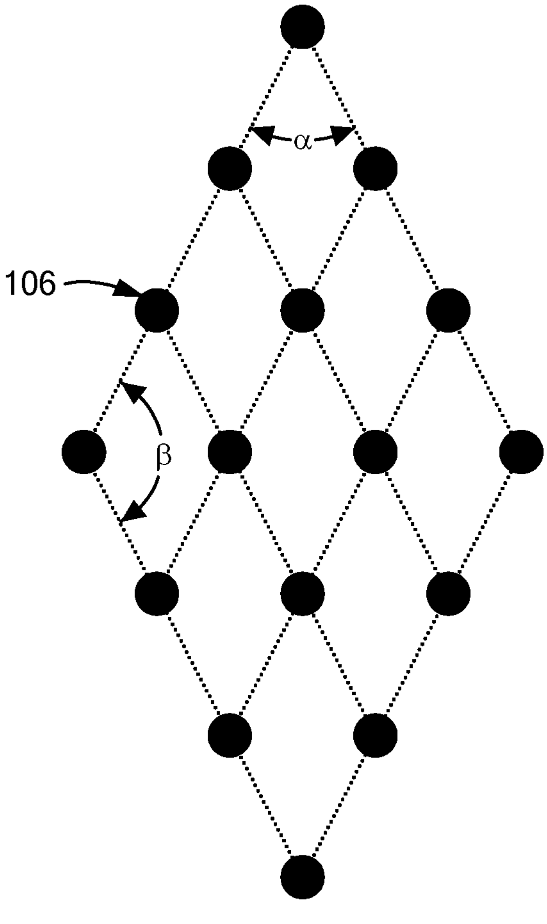
Figure 2C:
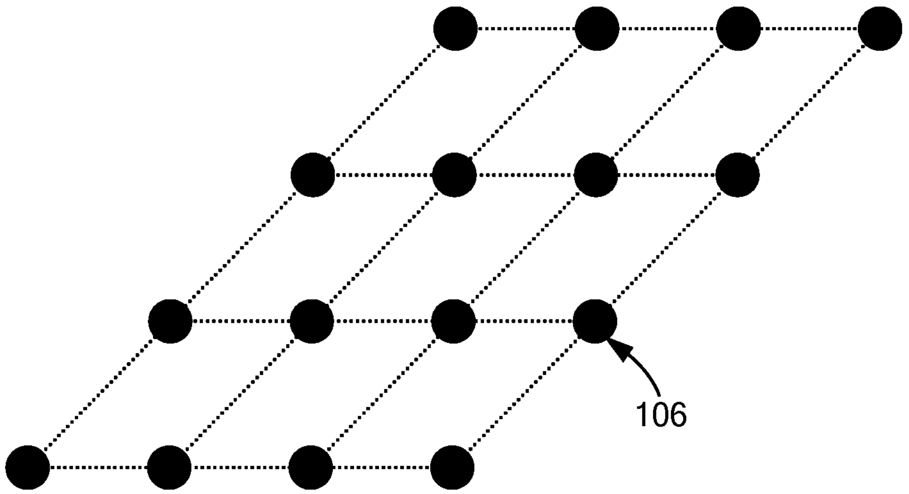
Figure 2D:
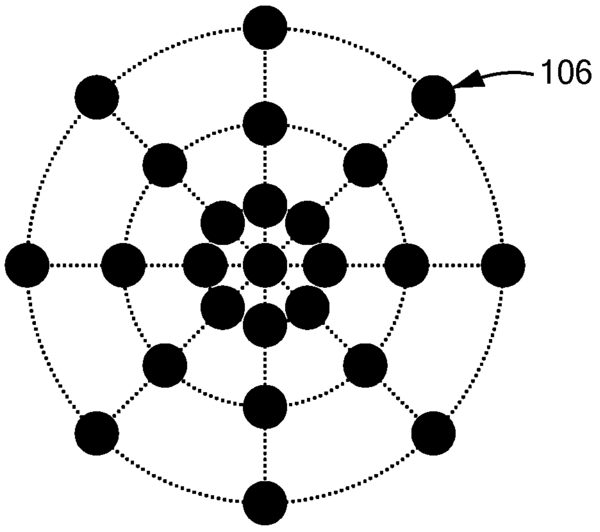
Figure 2E:
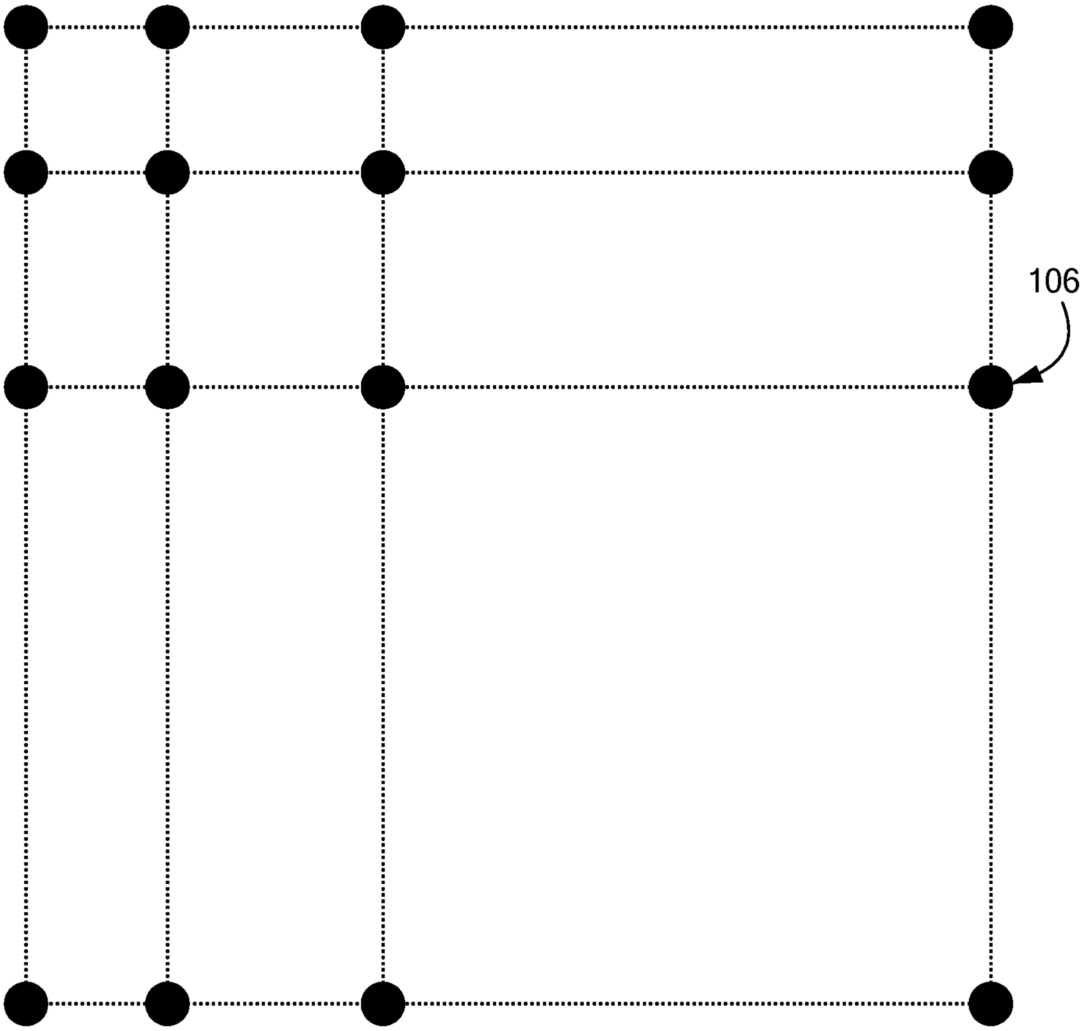
Figure 2F:
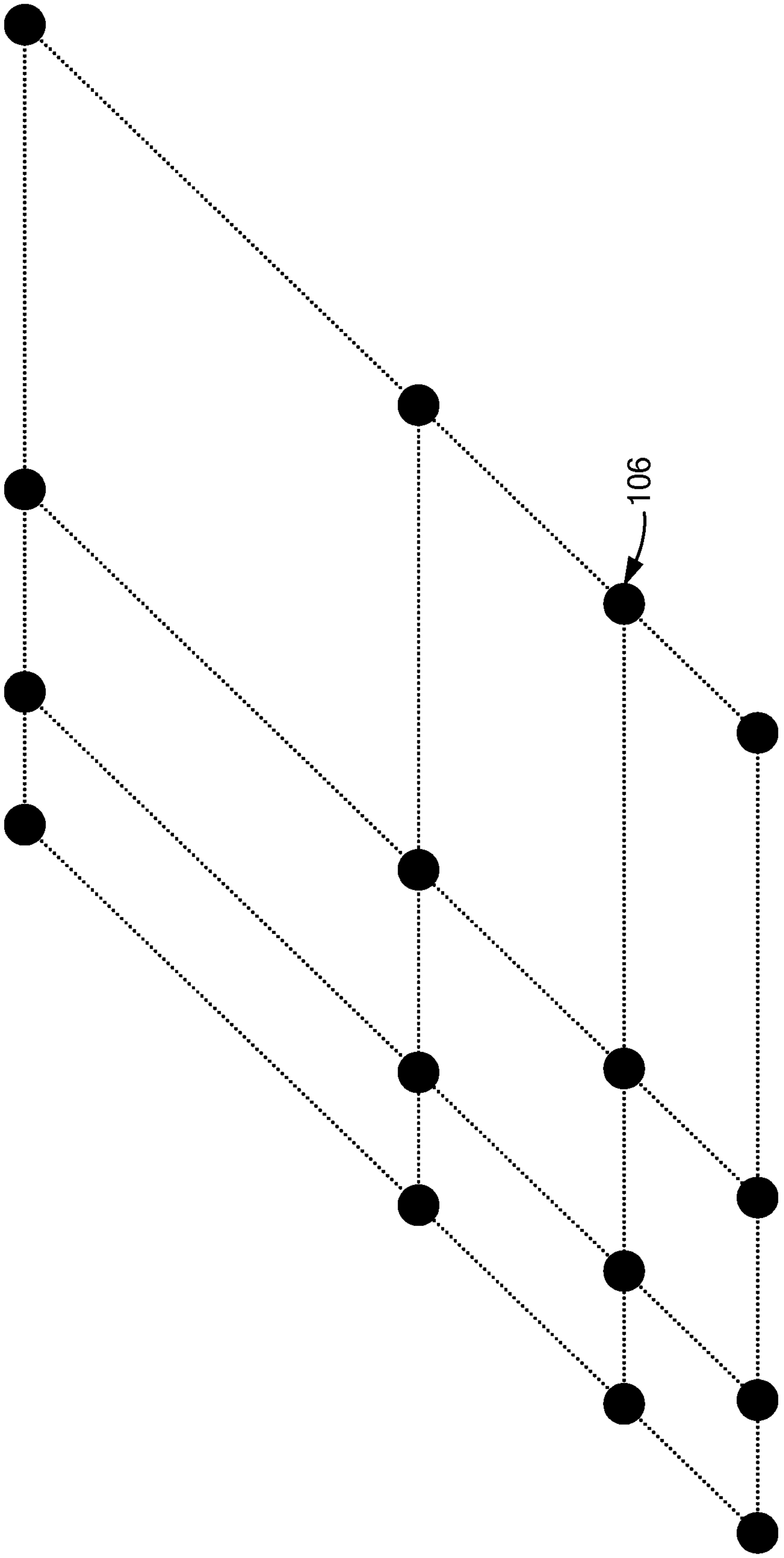
Figure 2G:
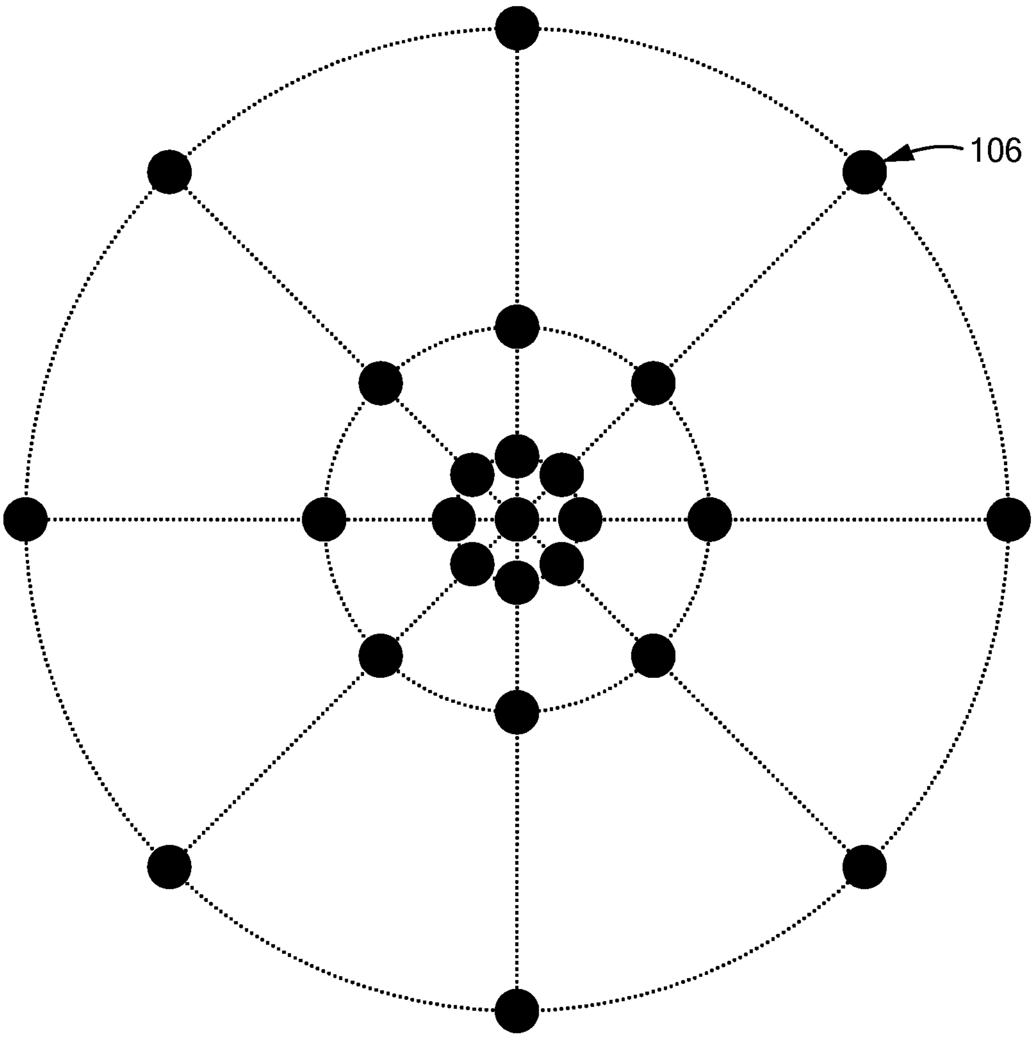

In an embodiment, and with reference to FIG. 1 and FIGS. 2A-2G, the plurality of reflectors 106 may be arranged in an array with a center-to-center spacing between neighboring reflectors in accordance with any of the following arrangements: equally spaced apart relative to each other in an x-y grid formation, where A=B (see FIGS. 1 and 2A, for example); spaced apart in a diamond formation where the diamond shape of the diamond formation has opposing internal angles $\alpha$<90-degrees and opposing internal angles $\beta$>90-degrees (see FIG. 2B, for example); spaced apart relative to each other in a uniform periodic pattern (see FIGS. 2A, 2B, 2C, 2D, for example); spaced apart relative to each other in an increasing or decreasing non-periodic pattern (see FIGS. 2E, 2F, 2G, for example); spaced apart relative to each other on an oblique grid in a uniform periodic pattern (see FIG. 2C, for example); spaced apart relative to each other on a radial grid in a uniform periodic pattern (see FIG. 2D, for example); spaced apart relative to each other on an x-y grid in an increasing or decreasing non-periodic pattern (see FIG. 2E, for example); spaced apart relative to each other on an oblique grid in an increasing or decreasing non-periodic pattern (see FIG. 2F, for example); spaced apart relative to each other on a radial grid in an increasing or decreasing non-periodic pattern (see FIG. 2G, for example); spaced apart relative to each other on a non-x-y grid in a uniform periodic pattern (see FIGS. 2B, 2C, 2D, for example); spaced apart relative to each other on a non-x-y grid in an increasing or decreasing non-periodic pattern (see FIGS. 2F, 2G, for example). While various arrangements of the plurality of reflectors is depicted herein, via FIGS. 1 and 2A-2G for example, it will be appreciated that such depicted arrangements are not exhaustive of the many arrangements that may be configured consistent with a purpose disclosed herein. As such, any and all arrangements of the plurality of reflectors disclosed herein for a purpose disclosed herein are contemplated and considered to be within the ambit of the invention disclosed herein.

Figure 3:
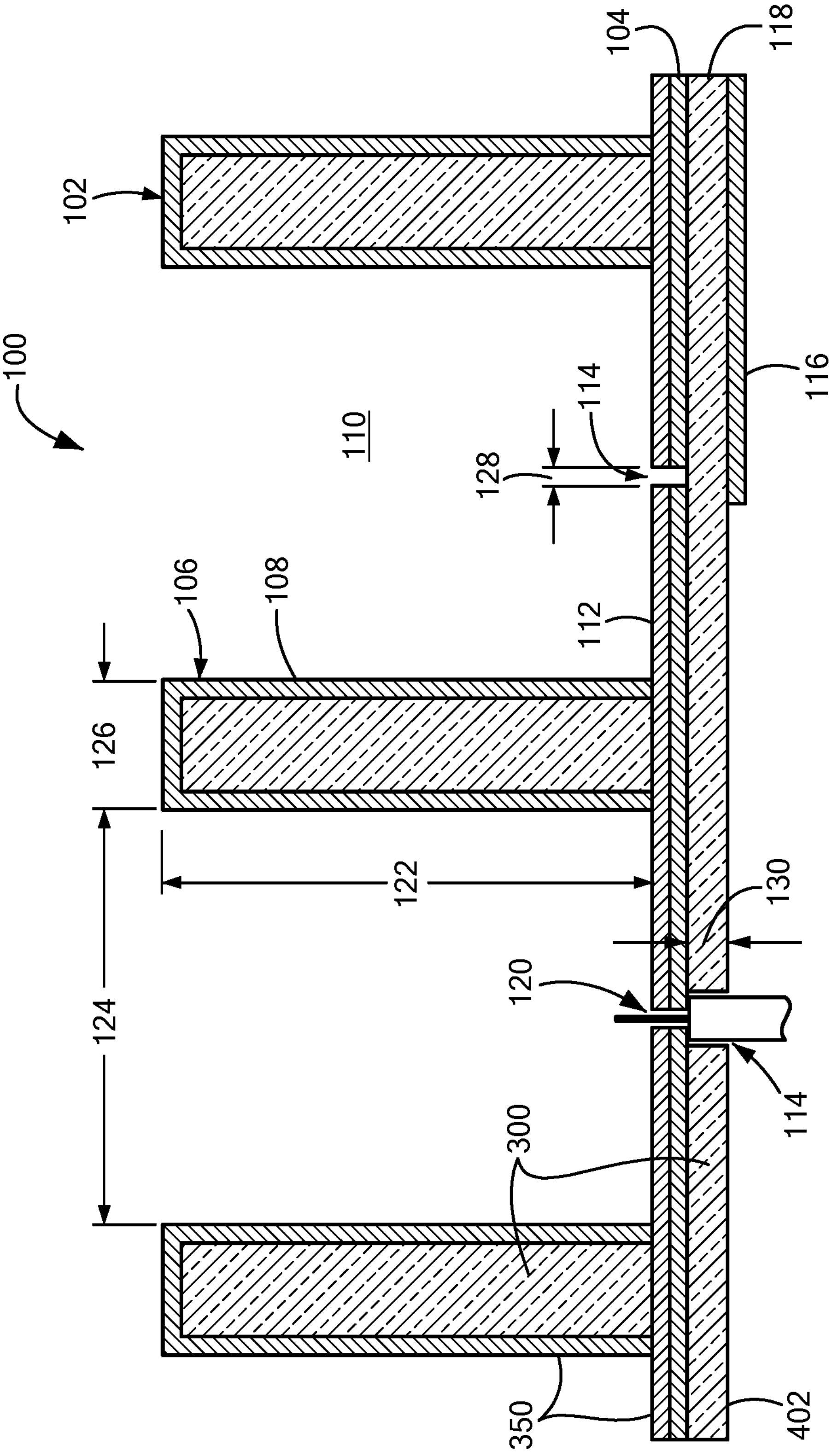
FIG. 3 depicts an elevation view cross section of an example EM device similar to that of FIG. 1, but formed from two or more constituents that are indivisible from each other once formed, in accordance with an embodiment.

In an embodiment and with reference now to FIG. 3, the unitary electromagnetically reflective structure 102 of the EM device 100 may be a composite structure formed from two or more constituents that are indivisible from each other once formed without permanently damaging or destroying the two or more constituents. For example, the unitary electromagnetically reflective structure 102 may comprise a non-metallic portion 300 (e.g., which may comprise one or more non-metallic portions) and a metallic coating 350 disposed over at least a portion of the non-metallic portion 300. In an embodiment, the metallic coating 350 is disposed over all exposed surfaces of the non-metallic portion 300, where the metallic coating 350 may be subsequently machined, etched, or otherwise removed for reasons consistent with a purpose disclosed herein (such as for the creation of a feed structure 113 having an aperture 114 for example). The metallic coating as disclosed herein may be copper or any other electrically conductive material suitable for a purpose disclosed herein, and may be a clad layer, a deposited or electrodeposited or vapor coating, or a physical vapor deposited metallic coating, a plated or electroplated coating, or electroless plated coating, or any other layer, coating, or deposition of a metal, or a composition comprising a metal, suitable for a purpose disclosed herein. In an embodiment, the non-metallic portion 300 comprises a polymer, a polymer laminate, a reinforced polymer laminate, a glass-reinforced epoxy laminate, or any other polymeric material or composition suitable for a purpose disclosed herein, such as a molded polymer or an injection molded polymer, for example. As illustrated, the unitary electromagnetically reflective structure 102 depicted in FIG. 3 includes an electrically conductive structure 104 and a plurality of electrically conductive electromagnetic reflectors 106 that are integrally formed with or are in electrical communication with the electrically conductive structure 104. Each reflector of the plurality of reflectors 106 forms a wall 108 that defines and at least partially circumscribes a recess 110 having an electrically conductive base 112 that forms part of or is in electrical communication with the electrically conductive structure 104, and where the electrically conductive base 112 includes an aperture 114 configured to receive an electromagnetic signal, such as from micro-strip feeds 116, for example. More generally, the feed structure 113 may be any transmission line, including a stripline or microstrip, or may be a waveguide, such as a substrate integrated waveguide, for example. In an embodiment, the electrically conductive base 112 may be one and the same with the electrically conductive structure 104. In an embodiment, the electrically conductive base 112 and the electrically conductive structure 104 are separated from the micro-strip feeds 116 via an intervening dielectric layer 118. In another embodiment, and alternative to the microstrip 116, a coaxial cable 120 may be disposed within the aperture 114, where the aperture 114 would extend through the dielectric layer 118 for insertion of the coaxial cable 120 therein. While FIG. 3 depicts both a microstrip 116 and a coaxial cable 120, it will be appreciated that such depiction is for illustrative purposes only, and that an embodiment of the invention may utilize just one type of signal feed, or any combination of signal feeds as disclosed herein, or as otherwise known in the art.

In a 60 GHz application, the EM device 100 may have the following dimensions: a height 122 of the reflector wall 108 of about 1 millimeter (mm); an overall opening dimension 124 of the recess 110 of about 2.2 mm; a minimum wall thickness dimension 126 between adjacent reflectors 106 of about 0.2 mm; an aperture dimension 128 of the aperture 114 of about 0.2 mm; and, a thickness dimension 130 of the dielectric layer 118 of about 0.1 mm.

Figure 4:
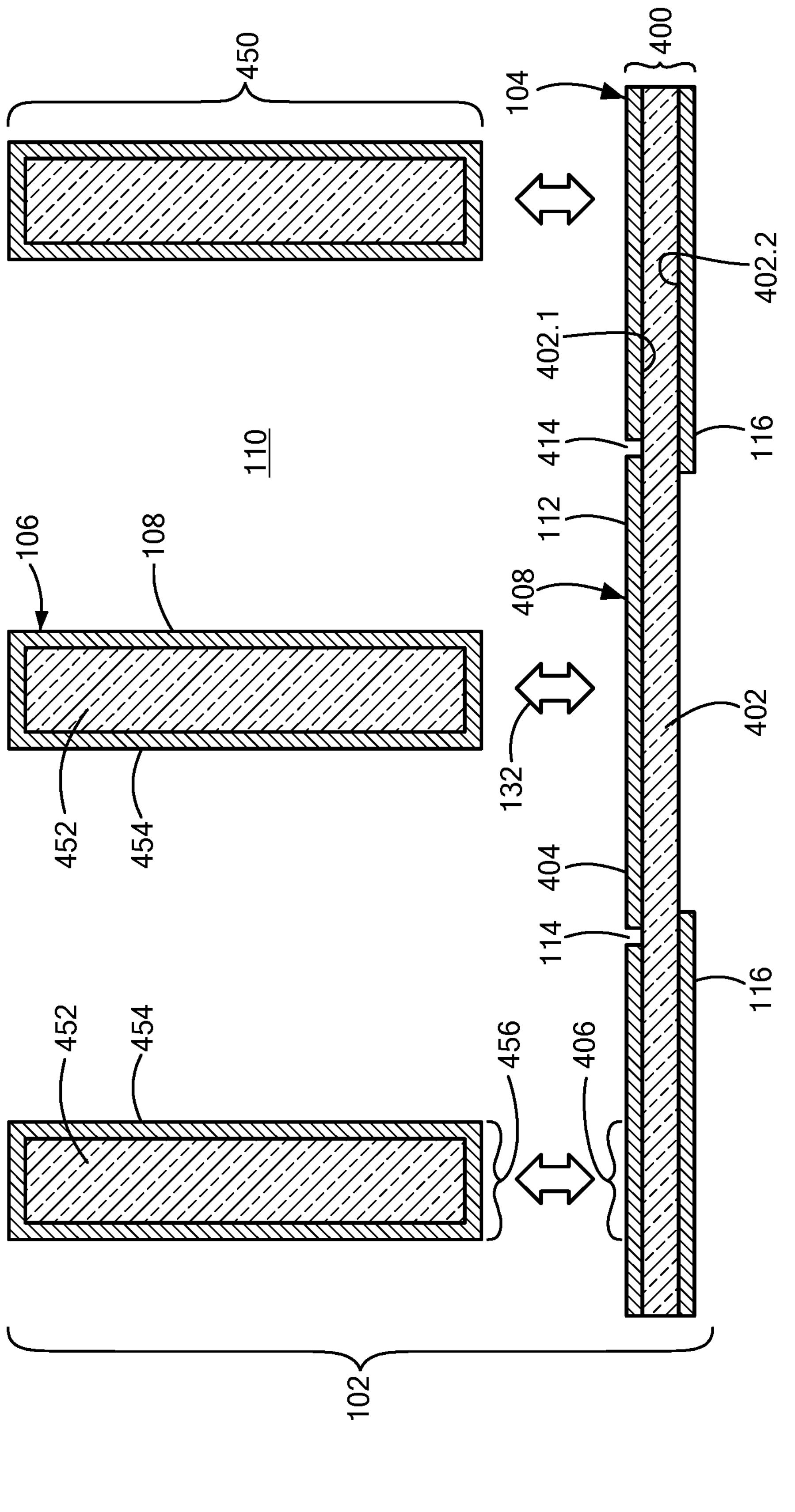
FIG. 4 depicts an elevation view cross section of an example EM device similar to that of FIG. 1, but formed from a first arrangement and a second arrangement of constituents, and depicted in a partially assembled state, in accordance with an embodiment.

With reference now to FIG. 4, an embodiment includes the unitary electromagnetically reflective structure 102 being formed from a first arrangement 400 and a second arrangement 450, where the first arrangement 400 has a first non-metallic portion 402 with a first metallic coating 404, and the second arrangement 450 has a second non-metallic portion 452 with a second metallic coating 454. At least a portion 456 of the second metallic coating 454 is in electrical communication with at least a portion 406 of the first metallic coating 404 when the first and second arrangements 400, 450 are assembled to each other (see assembly arrows 132). The electrical communication between portions 406 and portions 456 may be provided by any means suitable for a purpose disclosed herein, such as for example by metallurgical bonding via heat and/or pressure treatment, metallurgical bonding via vibratory welding, metallurgical bonding via a metal solder, or adhesive bonding such as via an electrically conductive resin such as a silver filled epoxy for example. Such bonding examples are presented herein as non-limiting examples only, and are not intended to be inclusive of all possible manners of achieving a desired degree of electrical communication for a purpose disclosed herein. The first arrangement 400, and more particularly the first metallic coating 404, at least partially provides the electrically conductive structure 104. The second arrangement 450, and more particularly the second metallic coating 454, at least partially provides the plurality of electrically conductive electromagnetic reflectors 106 having the walls 108 that define and at least partially circumscribes the recesses 110. Another portion 408 of the first metallic coating 404 forms the electrically conductive base 112 that forms part of or is in electrical communication with the electrically conductive structure 104. In an embodiment, the electrically conductive base 112, and more particularly the first metallic coating 404, includes an aperture 114 configured to receive an electromagnetic signal. As depicted in FIG. 4, the first non-metallic portion 402 has a first side 402.1 and an opposing second side 402.2, wherein the first metallic coating 404 having the aperture 114 is disposed on the first side 402.1 of the first non-metallic portion 402.

In an embodiment, an electrically conductive microstrip 116 is disposed on the second side 402.2 of the first non-metallic portion 402, where the microstrip 116 is disposed in signal communication with the aperture 114. In an embodiment, the aperture 114 is a slotted aperture having a lengthwise slot direction disposed orthogonal to the microstrip 116. In another embodiment, and alternative to the microstrip 116, a coaxial cable 120 may be disposed within the aperture 114, where here the aperture 114 would extend through the first non-metallic portion 402 for insertion of the coaxial cable 120 therein (similar to the depiction in FIG. 3, for example). In another embodiment, a stripline may be disposed on the second side 402.2 of the first non-metallic portion 402 (similar to the microstrip 116), and a backside non-metallic portion provided to sandwich the stripline, where the backside non-metallic portion includes a ground plane that shields the stripline (best seen and discussed further below with reference to FIG. 10).

From the foregoing descriptions relating to FIGS. 3 and 4, it will be appreciated that an embodiment of an EM device 100 includes a unitary electromagnetically reflective structure 102 having a combination of a non-metallic portion 300, 402, 452 and a metallic coating 350, 404, 454 over at least a portion of the non-metallic portion, the combination forming an electrically conductive structure 104 and an electrically conductive electromagnetic reflector 106 integrally formed with and in electrical communication with the electrically conductive structure, wherein the reflector forms a wall 108 that defines and at least partially circumscribes a recess 110 having an electrically conductive base 112 that forms part of or is in electrical communication with the electrically conductive structure, and wherein the electrically conductive base has a aperture 114 configured to receive an electromagnetic signal.

Figure 5:
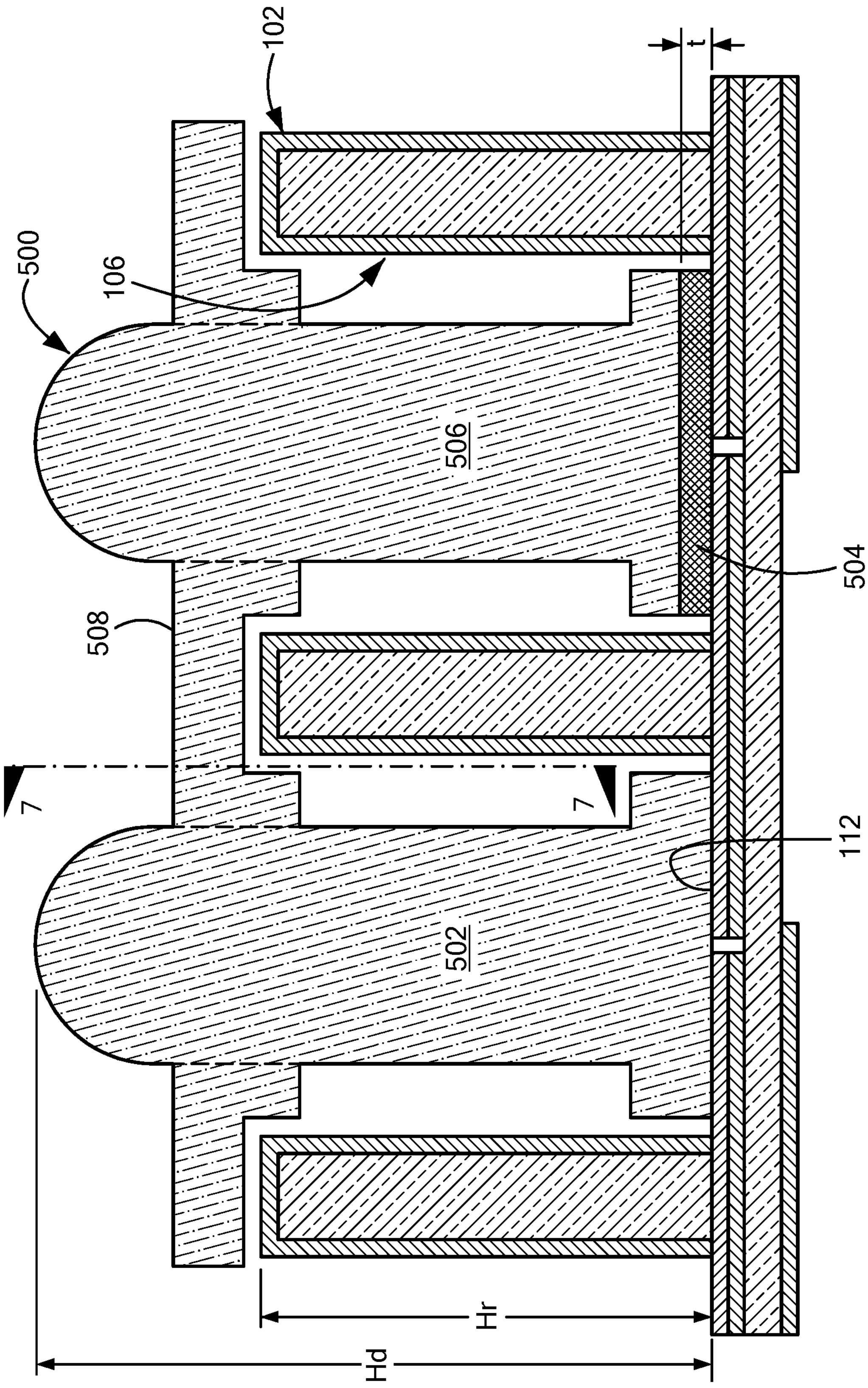
FIG. 5 depicts an example EM device similar to that of FIG. 3 with a plurality of DRAs, in accordance with an embodiment.
Figure 6:
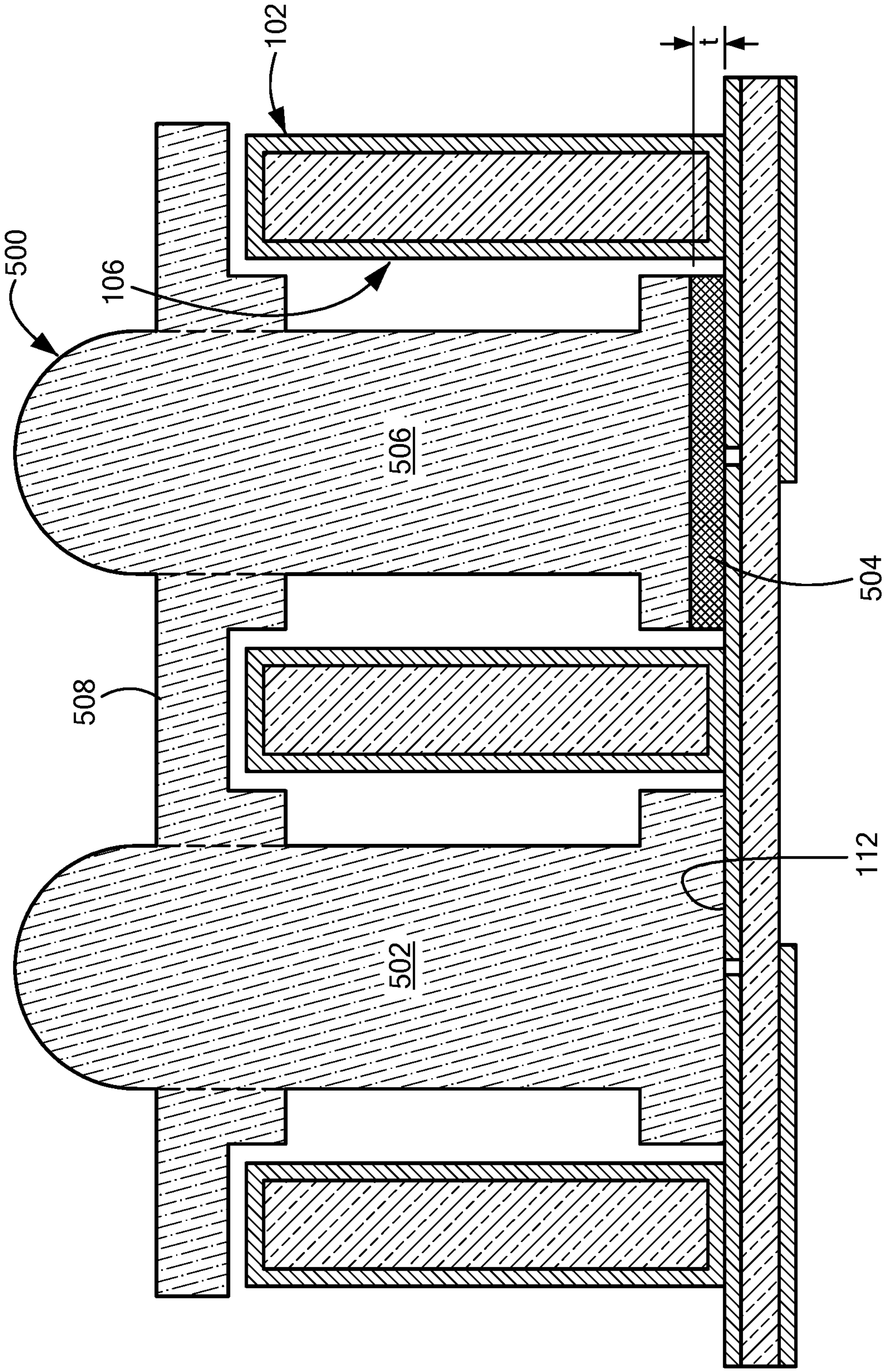
FIG. 6 depicts an example EM device similar to that of FIG. 4 with a plurality of DRAs, and depicted in a fully assembled state, in accordance with an embodiment.

Reference is now made to FIGS. 5 and 6, in combination with FIGS. 1, 3 and 4, where FIG. 5 depicts the unitary electromagnetically reflective structure 102 similar to that of FIG. 3, and FIG. 6 depicts the unitary electromagnetically reflective structure 102 similar to that of FIG. 4 when assembled and electrically connected at bonding portions 406, 456. FIGS. 5 and 6 each depict a plurality of dielectric resonator antennas (DRAs) 500, where each DRA 500 is disposed in one-to-one relationship with respective ones of the plurality of reflectors 106, and where each DRA 500 is disposed on an associated one of the electrically conductive base 112. In an embodiment, each DRA 500 is disposed directly on an associated one of the electrically conductive base 112, which is illustrated via DRA 502 in FIGS. 5 and 6. In another embodiment, each DRA 500 is disposed on an associated one of the electrically conductive base 112 with an intervening dielectric material 504 disposed therebetween, which is illustrated via DRA 506 disposed on top of dielectric material 504 in FIGS. 5 and 6. In an embodiment that employs an intervening dielectric material 504, the intervening dielectric material 504 has a thickness “t” that is equal to or less than $1/50^{th}$ an operating wavelength λ of the EM device 100, where the operating wavelength λ is measured in free space. In an embodiment, an overall height “Hr” of a given one of the plurality of reflectors 106 is less than an overall height “Hd” of a respective one of the plurality of DRAs 500, as observed in an elevation view. In an embodiment, Hr is equal to or greater than 80% of Hd.

Figure 7:
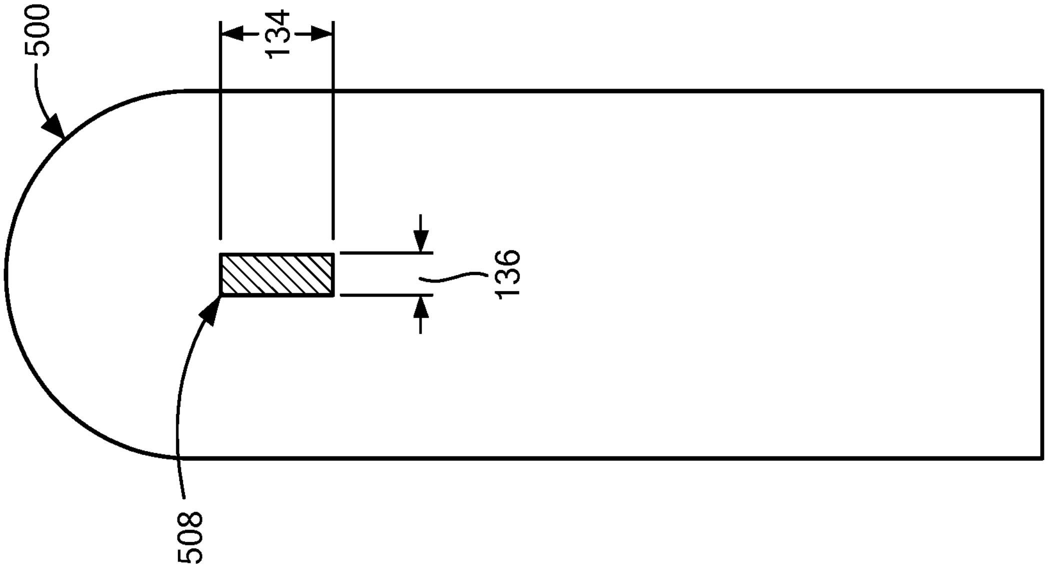
FIG. 7 depicts a cross section elevation view through cut line 7-7 of FIG. 5, in accordance with an embodiment.

With reference still to FIGS. 5 and 6, an embodiment includes an arrangement where adjacent neighbors of the plurality of DRAs 500 may optionally be connected (depicted by dashed lines) via a relatively thin connecting structure 508 that is relatively thin compared to an overall outside dimension of the associated connected DRA 502, 506. FIG. 7 depicts a cross section view through cut line 7-7 of the connecting structure 508 relative to the DRA 500, where the connecting structure 508 has a height dimension 134 and a width dimension 136, and where each of dimensions 134 and 136 are relatively thin, such as equal to or less than λ for example, or equal to or less than λ/2 for example. In an embodiment, the adjacent neighbors of the plurality of DRAs 500 are absolute closest adjacent neighbors. In another embodiment, the adjacent neighbors of the plurality of DRAs 500 are diagonally closest adjacent neighbors.

Each DRA 500 is operational at a defined frequency f with an associated operating wavelength λ, as measured in free space, and the plurality of reflectors 106 and associated DRAs 500 are arranged in an array with a center-to-center spacing (via the overall geometry of a given DRA array) between neighboring reflectors in accordance with any of the following arrangements: the reflectors 106 and associated DRAs 500 are spaced apart relative to each other with a spacing of equal to or less than λ; the reflectors 106 and associated DRAs 500 are spaced apart relative to each other with a spacing equal to or less than λ and equal to or greater than λ/2; or, the reflectors 106 and associated DRAs 500 are spaced apart relative to each other with a spacing equal to or less than λ/2. For example, at λ for a frequency equal to 10 GHz, the spacing from the center of one DRA to the center of a closet adjacent DRA is equal to or less than about 30 mm, or is between about 15 mm to about 30 mm, or is equal to or less than about 15 mm.

Figure 8:
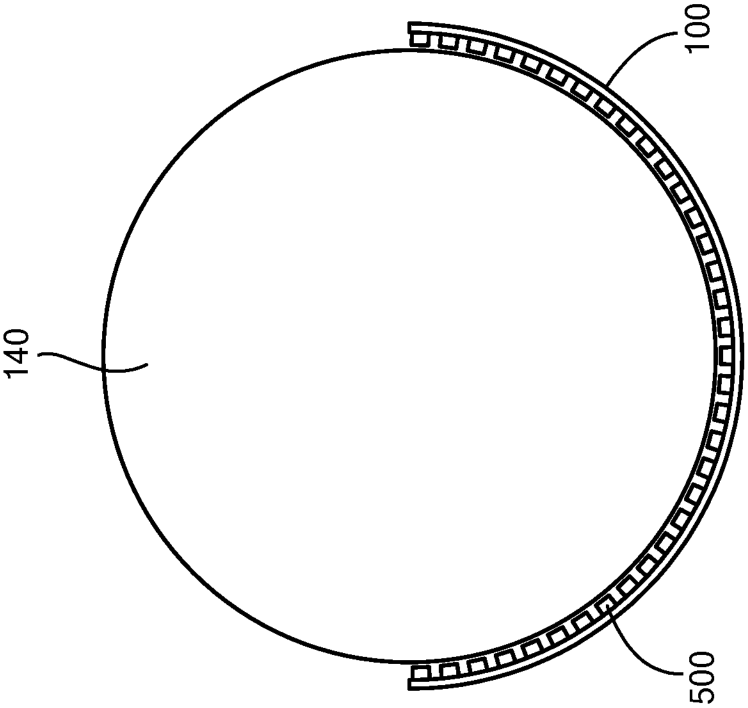
FIG. 8 depicts an example EM device similar to those of FIGS. 1-6 on a non-planar surface, in accordance with an embodiment.

In an embodiment, the plurality of reflectors 106 are disposed relative to each other on a planar surface, such as the electrically conductive structure 104 depicted in FIGS. 3 and 4 for example. However, the scope of the invention is not so limited, as the plurality of reflectors 106 may be disposed relative to each other on a non-planar surface 140 (see FIG. 8 for example), such as a spherical surface or a cylindrical surface, for example.

In an embodiment of a plurality of DRAs 500 and an EM device 100 as herein disclosed, the DRAs 500 may be singly fed, selectively fed, or multiply fed by one or more of the signal feeds, such as microstrip 116 (or stripline) or coaxial cable 120 for example. While only a microstrip 116 and a coaxial cable 120 have been depicted herein as being example signal feeds, in general, excitation of a given DRA 500 may be provided by any signal feed suitable for a purpose disclosed herein, such as a copper wire, a coaxial cable, a microstrip (e.g., with slotted aperture), a stripline (e.g., with slotted aperture), a waveguide, a surface integrated waveguide, a substrate integrated waveguide, or a conductive ink, for example, that is electromagnetically coupled to the respective DRA 500. As will be appreciated by one skilled in the art, the phrase electromagnetically coupled is a term of art that refers to an intentional transfer of electromagnetic energy from one location to another without necessarily involving physical contact between the two locations, and in reference to an embodiment disclosed herein more particularly refers to an interaction between a signal source having an electromagnetic resonant frequency that coincides with an electromagnetic resonant mode of the associated DRA. In those signal feeds that are directly embedded in a given DRA, the signal feed passes through the ground structure, in non-electrical contact with the ground structure, via an opening in the ground structure into a volume of dielectric material. As used herein, reference to dielectric materials other than non-gaseous dielectric materials includes air, which has a relative permittivity ($\varepsilon_r$) of approximately one at standard atmospheric pressure (1 atmosphere) and temperature (20 degree Celsius). As used herein, the term "relative permittivity" may be abbreviated to just "permittivity" or may be used interchangeably with the term "dielectric constant". Regardless of the term used, one skilled in the art would readily appreciate the scope of the invention disclosed herein from a reading of the entire inventive disclosure provided herein.

While embodiments may be described herein as being transmitter antenna systems, it will be appreciated that the scope of the invention is not so limited and also encompasses receiver antenna systems.

In view of the foregoing, it will be appreciated that an embodiment of the EM device 100 disclosed herein, with or without DRAs 500, may be formed on a printed circuit board (PCB) type substrate or at the wafer-level (e.g., semiconductor wafer, such as a silicon-based wafer) of an electronic component. For a PCB, the EM device 100 may be formed using blind fabrication processes, or through-hole vias, to create the recesses 110. The EM device 100 may be disposed over other laminate layers with a microstrip feeding network 116 (or stripline feeding network) sandwiched therebetween, and RF chips and other electronic components may be mounted on backside of the laminate, with apertures 114 electromagnetically connecting to the microstrip feeds 116.

Figure 9:
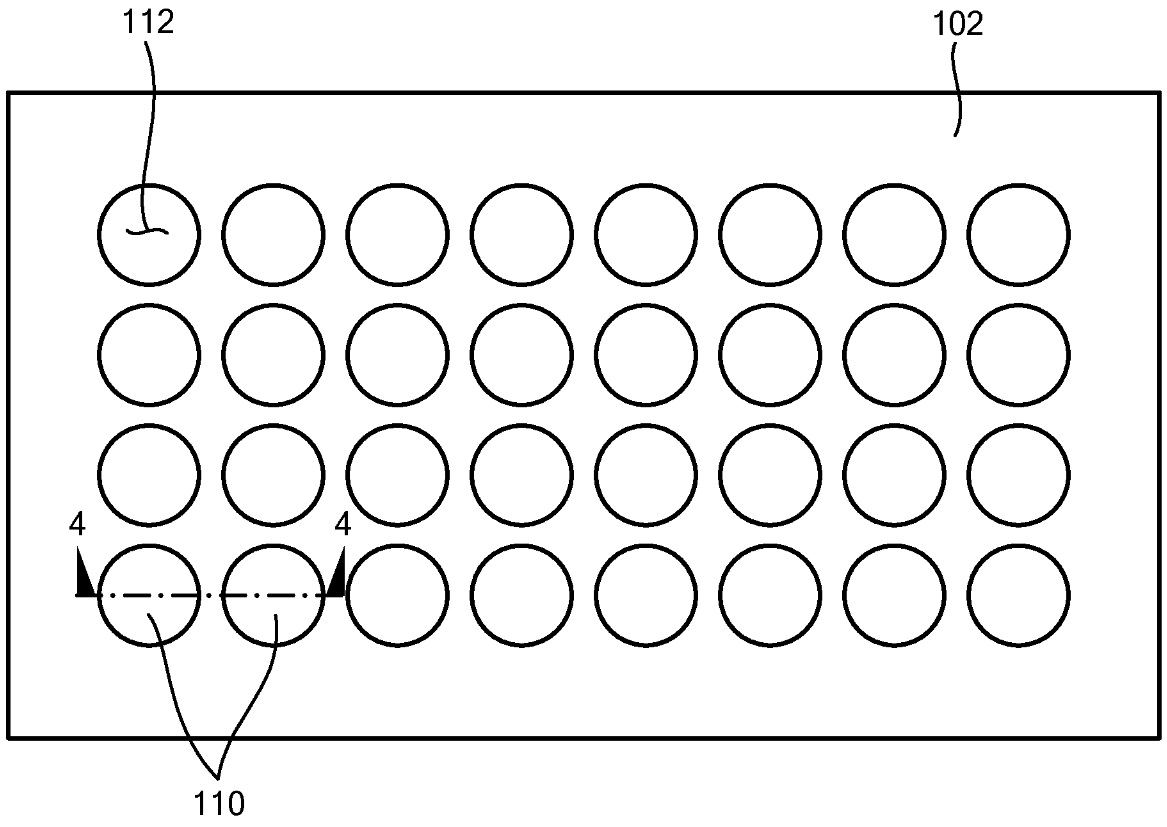
FIG. 9 depicts a plan view of a portion of the EM device of FIG. 4, in accordance with an embodiment.
Figure 10:
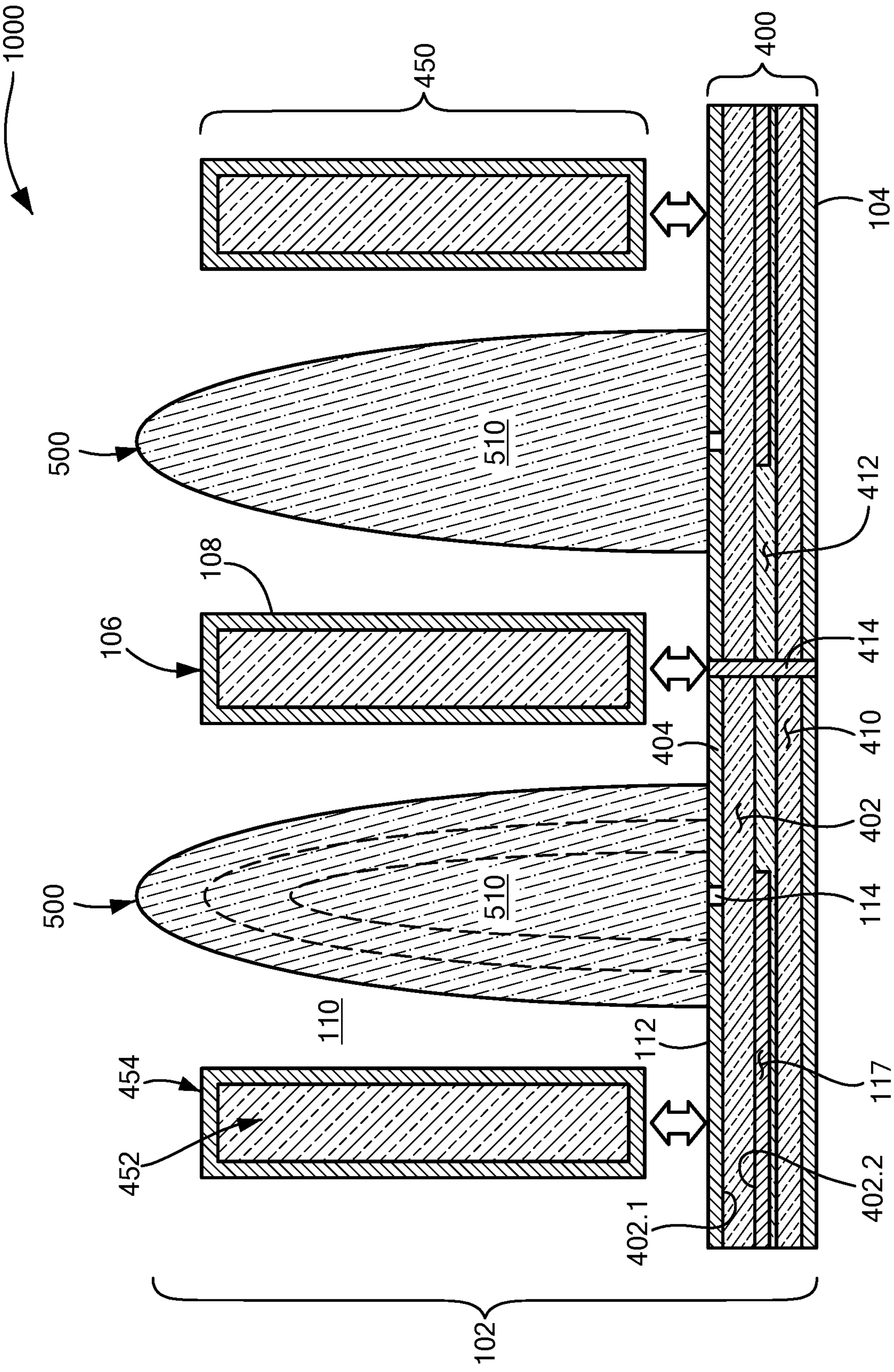
FIG. 10 depicts a cross section elevation view of an example EM device alternative to that depicted in FIG. 6, employing, inter alia, a stripline feed structure, in accordance with an embodiment.

In an embodiment, the recesses 110 may be formed by mechanically drilling or laser drilling, and/or routing or milling, through-hole vias, of about 2 mm diameter for example, through a board or substrate such as the aforementioned second non-metallic portion 452 (see FIG. 4), coating the drilled board with a metal such as the aforementioned second metallic coating 454, and bonding the drilled-and-coated board, the drilled-and-coated-board combination being synonymous with the aforementioned second arrangement 450 for example, to the aforementioned first arrangement 400 (see FIG. 4) using a low temperature bonding process, such as less than 300 degree-Celsius for example, that would allow the use of FR-4 glass-reinforced epoxy laminate or similar materials as a dielectric substrate for at least the second non-metallic portion 452. FIG. 9 depicts a plan view of an example drilled-and-coated-board (second arrangement 450), where the second arrangement 450 depicted in FIG. 4 is taken through the section cut line 4-4. Reference is now made to FIG. 10, which depicts an alternative embodiment of an assembly 1000 employing a shielded stripline feed structure. As illustrated, the assembly 1000 includes a unitary electromagnetically reflective structure 102 similar to that of FIG. 4, but with some differences in the structure of the first arrangement 400, which has a first non-metallic portion 402 with a first metallic coating 404 disposed on a first side 402.1 of the first non-metallic portion 402, a stripline 117 disposed on a second side 402.2 of the first non-metallic portion 402 (similar to the microstrip 116 depicted in FIG. 4), a backside non-metallic portion 410 provided to sandwich the stripline 117 between the first non-metallic portion 402 and the backside non-metallic portion 410, and a pre-preg layer 412 provided for bonding the first non-metallic portion 402 and the backside non-metallic portion 410, with the stripline 117 disposed therebetween. An outer (bottom) surface of the backside non-metallic portion 410 includes an electrically conductive ground structure 104 that is electrically connected to the first metallic coating 404 via electrically conductive paths 414. Features of the second arrangement 450 depicted in FIG. 10 are the same as those described in connection with FIG. 4 and are therefore not repeated here, but are simply enumerated in FIG. 10 with like reference numerals.

Also depicted in FIG. 10 are DRAs 500 absent the above described relatively thin connecting structures 508, where the DRAs 500 are also denoted by reference numeral 510 to indicate DRAs having an overall outer shape that differ from those depicted in FIG. 4. In FIG. 10, for example, the DRAs 510 have a bullet nose shape where the sidewalls have no linear or vertical portion, but instead transition in a continuous curved manner from a broad proximal end at the electrically conductive base 112 to a narrow distal end at a top peak of the DRAs 510. In general, FIGS. 5, 6, 7 and 10, serve to illustrate that a DRA 500 suitable for a purpose disclosed herein may have any shape (cross sectional shape as observed in an elevation view, and cross sectional shape as observed in a plan view) that is suitable for a purpose disclosed herein, such as dome-shaped with vertical side walls, bullet nose shape with no vertical side walls, hemispherical, or any combination of the foregoing, for example. Additionally, any DRA 500 disclosed herein may be a one-piece solid DRA, a hollow air core DRA, or a multi-layered DRA having dielectric layers with different dielectric constants, all versions of which are represented by the (optional) dashed lines depicted in the left-side DRA 510 in FIG. 10.

Figure 11:
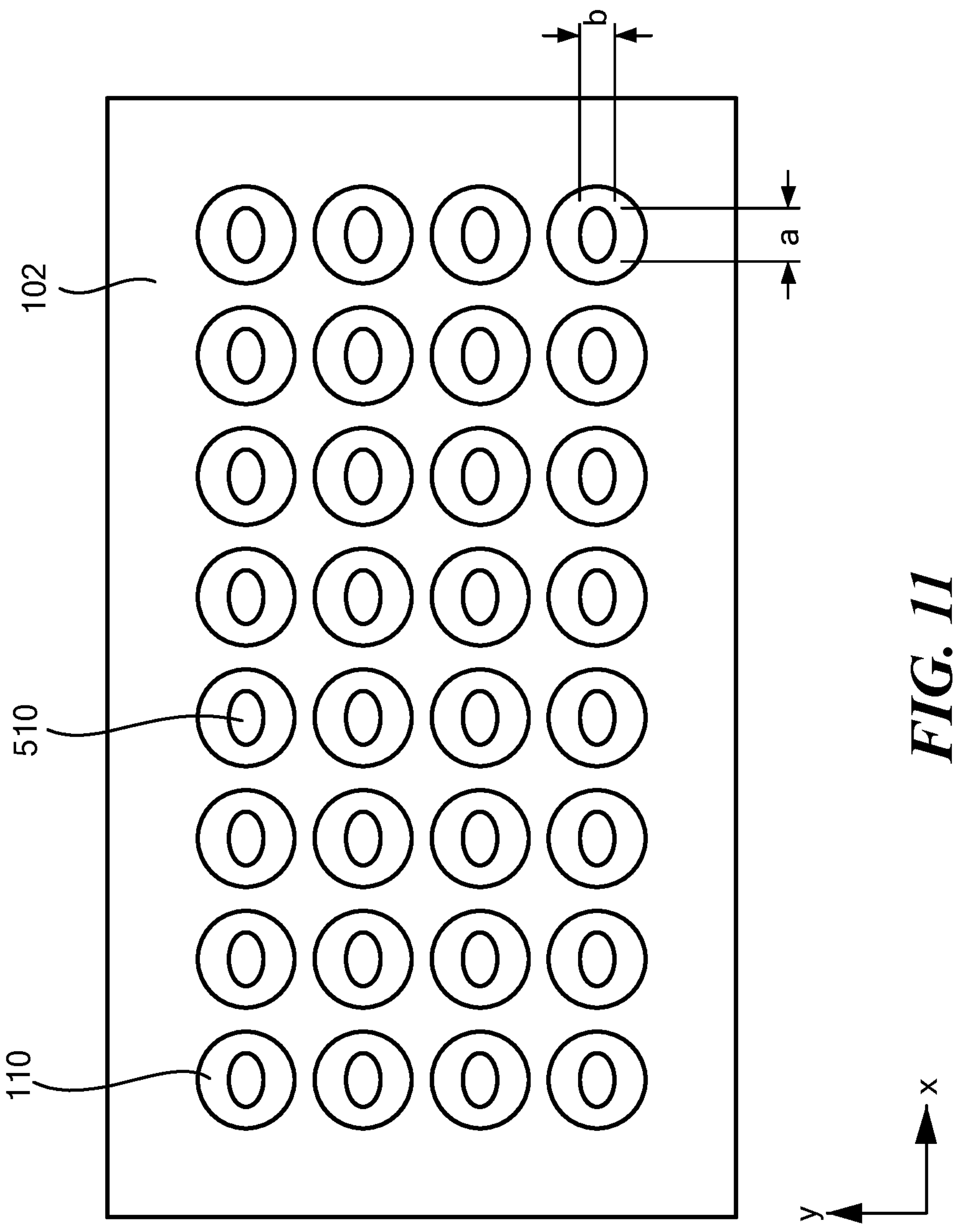
FIG. 11 depicts a plan view of the example EM device of FIG. 10 arranged as an array, in accordance with an embodiment.

FIG. 11 depicts a plan view of an array of the DRAs 510 of FIG. 10 disposed in respective ones of recesses 110 of a unitary electromagnetically reflective structure 102. Noteworthy in FIG. 11 is the overall DRA dimension “a” in the x-direction that is greater than the overall DRA dimension “b” in the y-direction, which serves to provide control of the matching and/or far field radiation depending on the type of feed structure used. In general, a DRA 500 suitable for a purpose disclosed herein may have any shape (cross sectional shape as observed in a plan view) that is suitable for a purpose disclosed herein.

Figure 12:
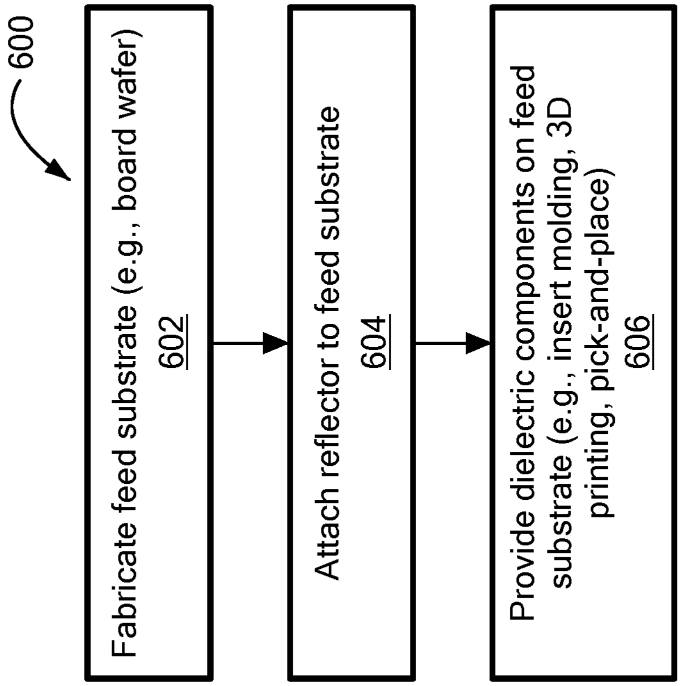
FIGS. 12 and 13 depict alternative methods of fabricating the EM device of FIG. 10, in accordance with an embodiment.
Figure 13:
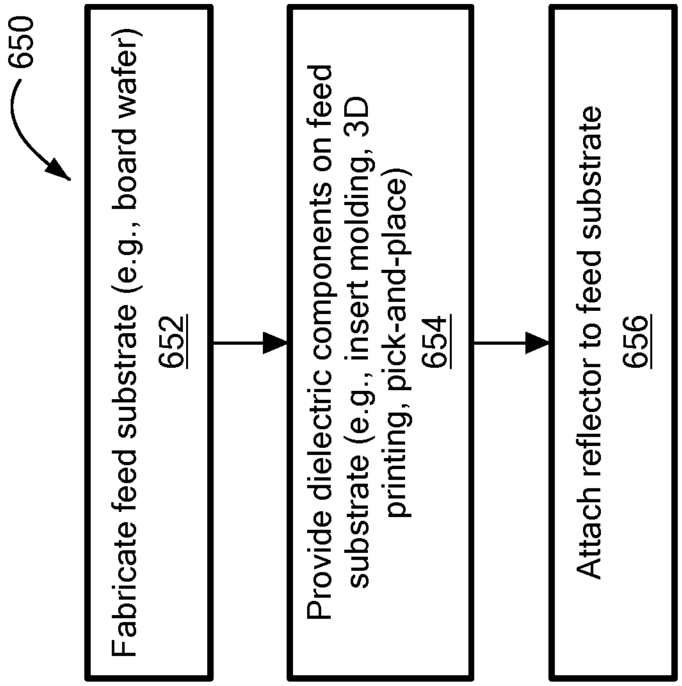

Reference is now made to FIGS. 12 and 13 in combination with FIG. 10, which in general illustrate two methods 600, 650 of fabricating the assembly 1000 of FIG. 10.

In method 600: first, the feed substrate is fabricated 602; second, the reflector structure is attached to the feed substrate 604; and lastly, dielectric components such as DRAs are provided onto the feed substrate 606, which may be accomplished via insert molding, 3D printing, pick-and-place, or any other fabrication means suitable for a purpose disclose herein.

Method 600 may be further described as, a method 600 of fabricating an electromagnetic device having an electromagnetically reflective structure comprising an electrically conductive structure and a plurality of electrically conductive electromagnetic reflectors that are integrally formed with or are in electrical communication with the electrically conductive structure, wherein the plurality of reflectors are disposed relative to each other in an ordered arrangement, wherein each reflector of the plurality of reflectors forms a wall that defines and at least partially circumscribes a recess having an electrically conductive base that forms part of or is in electrical communication with the electrically conductive structure, the method comprising: providing the electromagnetically reflective structure and inserting it into a mold; and, molding one or more dielectric resonator antennas, DRAs, onto the electromagnetically reflective structure, and allowing the DRAs to at least partially cure; wherein the one or more DRAs are disposed in one-to-one relationship with a respective one of the recess.

In method 650: first, the feed substrate is fabricated 652; second, dielectric components such as DRAs are provided onto the feed substrate 654, which may be accomplished via insert molding, 3D printing, pick-and-place, or any other fabrication means suitable for a purpose disclose herein; and lastly, the reflector structure is attached to the feed substrate 656.

Method 650 may be further described as, a method 650 of fabricating an electromagnetic device having an electromagnetically reflective structure comprising an electrically conductive structure and a plurality of electrically conductive electromagnetic reflectors that are integrally formed with or are in electrical communication with the electrically conductive structure, wherein the plurality of reflectors are disposed relative to each other in an ordered arrangement, wherein each reflector of the plurality of reflectors forms a wall that defines and at least partially circumscribes a recess having an electrically conductive base that forms part of or is in electrical communication with the electrically conductive structure, the method comprising: providing a feed structure comprising the electrically conductive structure and inserting the feed structure into a mold; molding one or more dielectric resonator antennas, DRAs, onto the feed structure, and allowing the DRAs to at least partially cure to provide a DRA subcomponent; and, providing a reflector structure comprising the plurality of electrically conductive electromagnetic reflectors and attaching the reflector structure to the DRA subcomponent such that the plurality of electrically conductive electromagnetic reflectors are integrally formed with or are in electrical communication with the electrically conductive structure; wherein the one or more DRAs are disposed in one-to-one relationship with a respective one of the recess.

In either method 600 or method 650, the feed substrate may be a board (e.g., PCB), a wafer (e.g., silicon wafer, or other semiconductor-based wafer), or the first arrangement 400 depicted in either FIG. 4 or FIG. 10, the reflector structure may be the second arrangement 450 depicted in either FIG. 4 or FIG. 10, and the dielectric components may be any of the DRAs 500 depicted in the several figures provided herein.

Figure 14A:
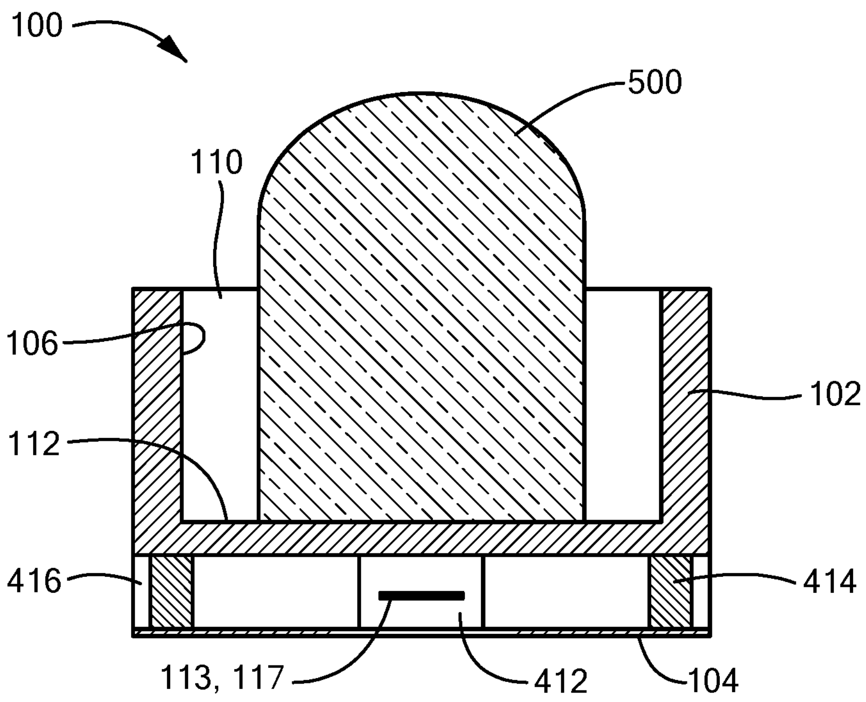
FIGS. 14A and 14B depict, respectively, a cross section elevation view, and a cross section plan view, of the example EM device of FIGS. 10-11 employing, inter alia, electrically conducting ground vias, in accordance with an embodiment.
Figure 14B:
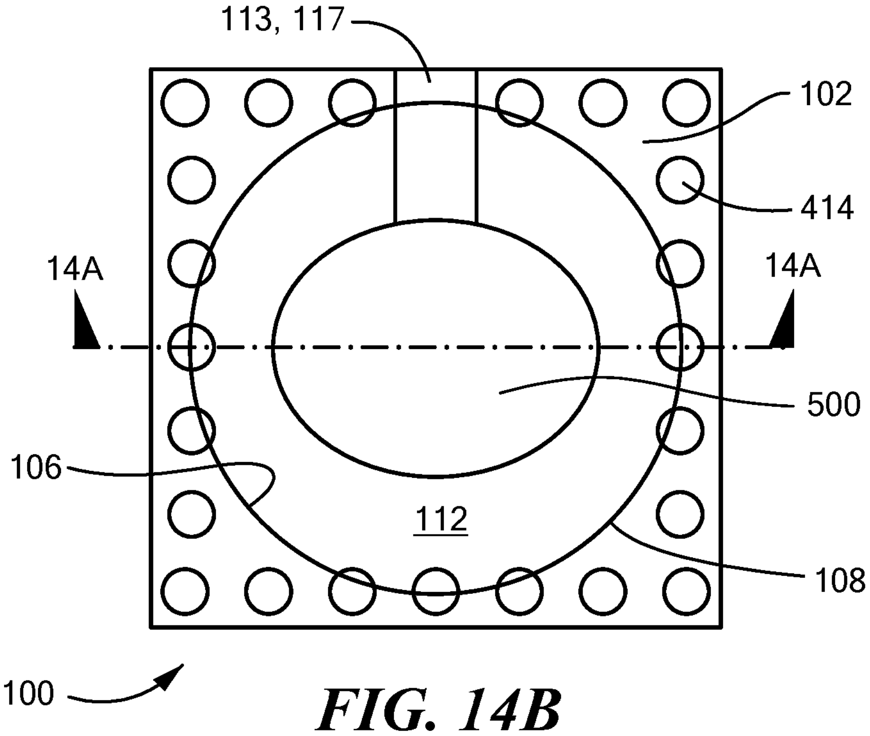

Reference is now made to FIGS. 14A and 14B in combination with FIG. 1, where FIG. 14A depicts a cross section elevation view, and FIG. 14B depicts a cross section plan view, of an EM device 100 comprising a unitary electromagnetically reflective structure 102 having an electrically conductive structure 104, and an electrically conductive electromagnetic reflector 106 that is integrally formed with or is in electrical communication with the electrically conductive structure 104. The reflector 106 forms a wall 108 that defines and at least partially circumscribes a recess 110 having an electrically conductive base 112 that forms part of or is in electrical communication with the electrically conductive structure 104, and where the electrically conductive base 112 includes a feed structure 113 configured to receive an electromagnetic signal. As depicted, a DRA 500 is disposed within the recess 110 and is in contact with the electrically conductive base 112. Comparing FIGS. 14A and 14B with FIG. 10, similarities can be seen. For example, the embodiment of FIGS. 14A, 14B has a feed structure 113 in the form of a stripline 117 that is embedded within a dielectric medium, such as a pre-preg medium 412 for example, and has electrically conductive paths 414 in the form of ground vias that electrically connect the electrically conductive base 112 to the electrically conductive structure (ground) 104. Separating the electrically conductive base 112 from the electrically conductive structure 104, and through which the ground vias 414 pass, is a dielectric medium 416 similar to one or more of the first non-metallic portion 402, the backside non-metallic portion 410, or the pre-preg layer 412 (discussed above in connection with FIG. 10).

Figure 15:
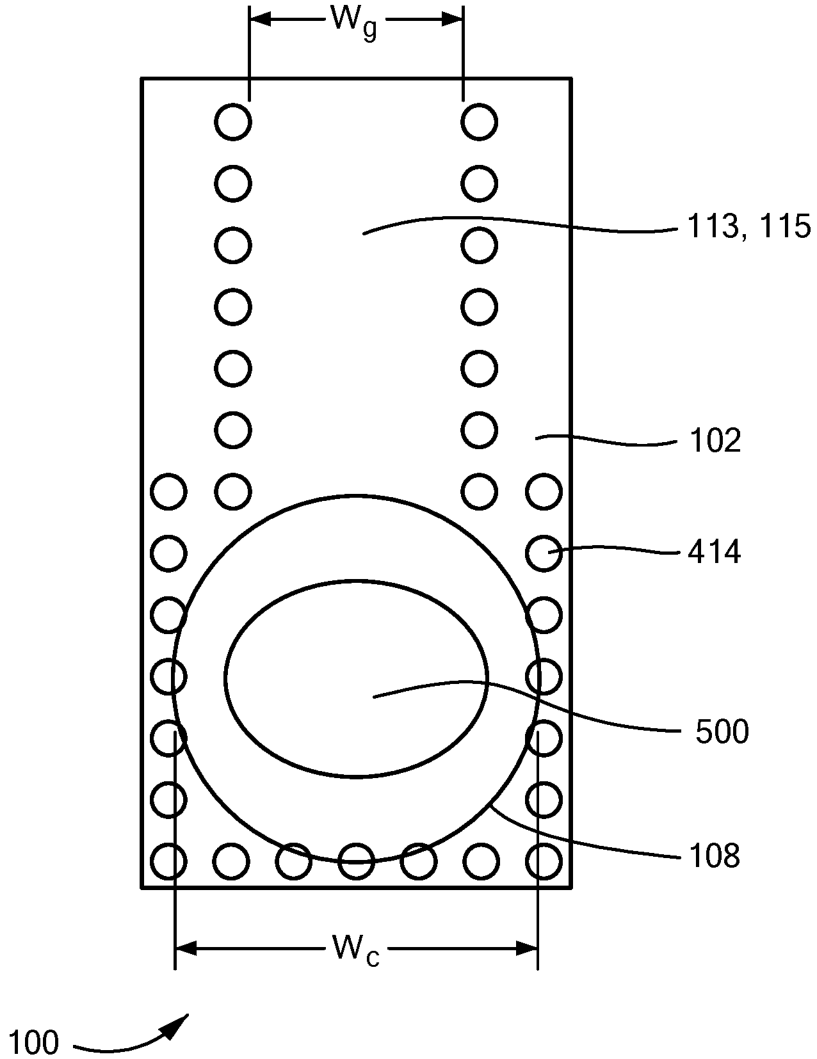
FIGS. 15 and 16 depict plan views of alternative example EM devices similar to that of FIG. 14B, but with a feed structure in the form of a substrate integrated waveguide, in accordance with an embodiment.
Figure 16:
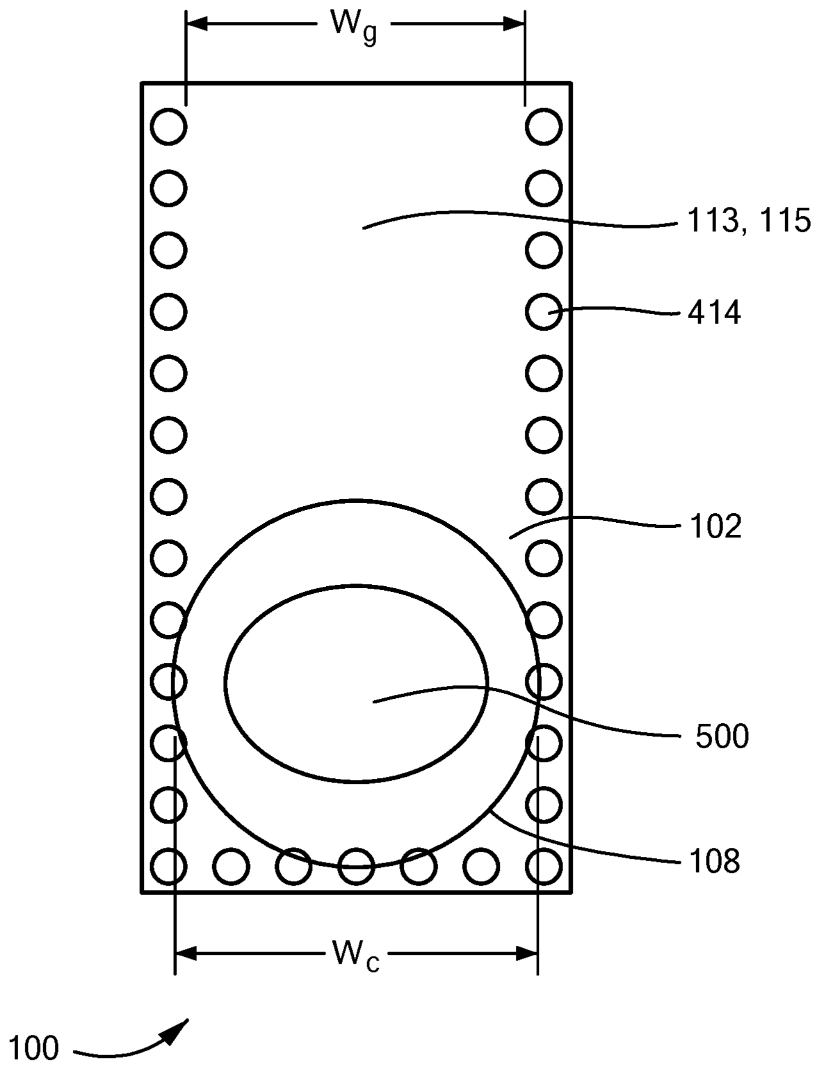

Reference is now made to FIGS. 15 and 16 in combination with FIGS. 14A, and 14B where each of FIGS. 15 and 16 depict alternative plan views of an EM device 100 similar to that of FIG. 14B, but with an alternative feed structure 113. in the form of a substrate integrated waveguide (SIW) 115, which takes the place of the stripline 117 of FIGS. 14A and 14B. The feed path of the SIW 115 can be seen with reference to FIGS. 15 and 14A, and with reference to FIGS. 16 and 14A, where the feed path of the SIW 115 has an upper electrically conductive waveguide boundary formed by the electrically conductive base 112, a lower electrically conductive waveguide boundary formed by the electrically conductive (ground) structure 104, and left/right electrically conductive waveguide boundaries formed by the electrically conductive vias 414 that electrically connect the electrically conductive base 112 to the electrically conductive (ground) structure 104. A dielectric medium 416 is disposed within the aforementioned waveguide boundaries and may be similar to one or more of the first non-metallic portion 402, the backside non-metallic portion 410, or the pre-preg layer 412 (discussed above in connection with FIG. 10), or any other dielectric medium suitable for a purpose disclosed herein. Comparing FIGS. 15 and 16, the width Wg of the SIW 115 may be smaller than the width We of a unit cell of the EM device 100 (as defined by the overall outside dimension of the reflector wall 108) as depicted in FIG. 15, or the width Wg of the SIW 115 may be equal or substantially equal to the width We of a unit cell of the EM device 100 (as defined by the overall outside dimension of the reflector wall 108) as depicted in FIG. 16.

Figure 17:
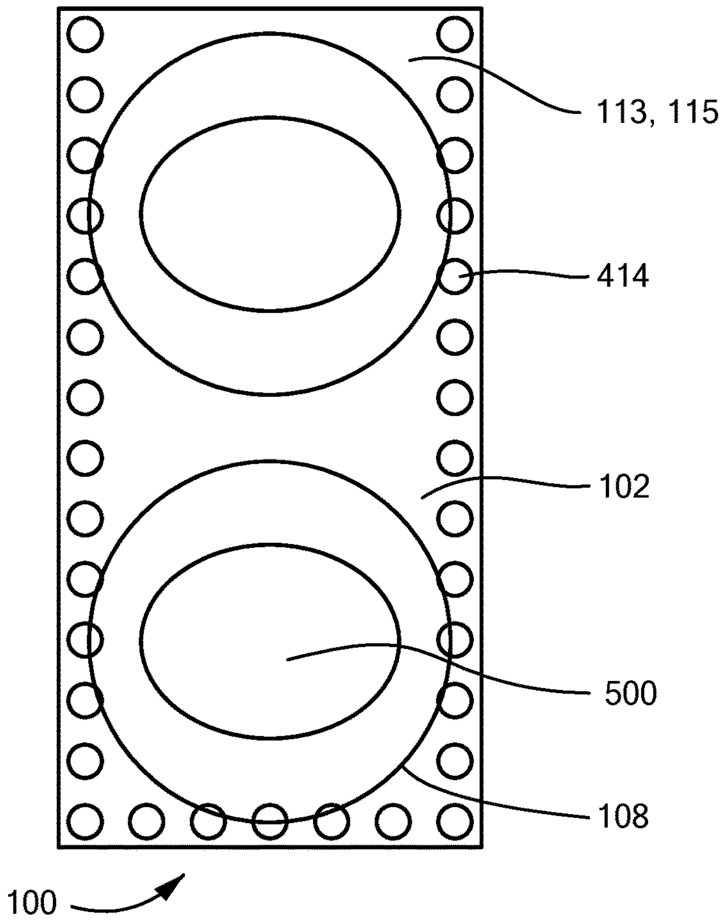
FIG. 17 depicts a plan view of an alternative example EM device similar to that of FIG. 16, but with multiple DRAs fed with a single substrate integrated waveguide, in accordance with an embodiment.

With reference now to FIG. 17, an embodiment includes an EM device 100 where multiple DRAs 500 are fed with a single SIW 115. And while only two DRAs 500 are depicted in FIG. 17, it will be appreciated that this is for illustration purposes only and that the scope of the invention is not so limited and includes any number of DRAs 500 consistent with the disclosure herein. Other features depicted in FIG. 17 that are like features with other figures provided herewith are enumerated with like reference numerals without the need for further description.

Figure 18:
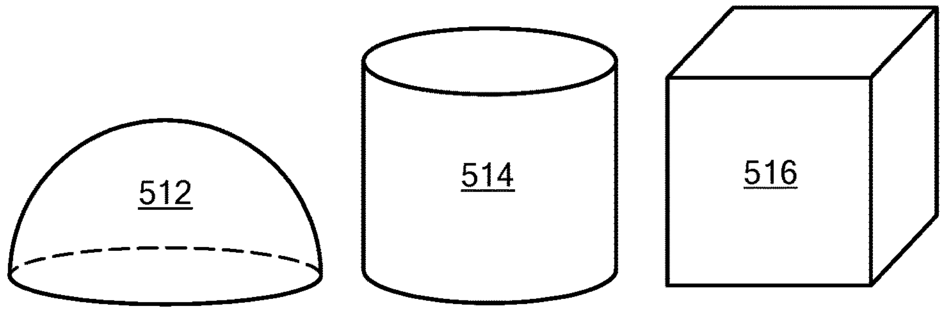
FIG. 18 depicts rotated isometric views of example DRAs useful for a purpose disclosed herein, in accordance with an embodiment.

While various embodiments of DRAs 500 have been described and illustrated herein above, it will be appreciated that the scope of the invention is not limited to DRAs 500 having only those three-dimensional shapes described and illustrated thus far, but encompasses any 3-D shaped DRA suitable for a purpose disclosed herein, which includes hemi-spherical shaped DRAs 512, cylindrical shaped DRAs 514, and rectangular shaped DRAs 516, as depicted in FIG. 18, for example.

Dielectric Materials

The dielectric materials for use herein are selected to provide the desired electrical and mechanical properties for a purpose disclosed herein. The dielectric materials generally comprise a thermoplastic or thermosetting polymer matrix and a filler composition containing a dielectric filler. The dielectric volume can comprise, based on the volume of the dielectric volume, 30 to 100 volume percent (vol %) of a polymer matrix, and 0 to 70 vol % of a filler composition, specifically 30 to 99 vol % of a polymer matrix and 1 to 70 vol % of a filler composition, more specifically 50 to 95 vol % of a polymeric matrix and 5 to 50 vol % of a filler composition. The polymer matrix and the filler are selected to provide a dielectric volume having a dielectric constant consistent for a purpose disclosed herein and a dissipation factor of less than 0.006, specifically, less than or equal to 0.0035 at 10 GigaHertz (GHz). The dissipation factor can be measured by the IPC-TM-650 X-band strip line method or by the Split Resonator method.

The dielectric volume comprises a low polarity, low dielectric constant, and low loss polymer. The polymer can comprise 1,2-polybutadiene (PBD), polyisoprene, polybutadiene-polyisoprene copolymers, polyetherimide (PEI), fluoropolymers such as polytetrafluoroethylene (PTFE), polyimide, polyetheretherketone (PEEK), polyamidimide, polyethylene terephthalate (PET), polyethylene naphthalate, polycyclohexylene terephthalate, polyphenylene ethers, those based on allylated polyphenylene ethers, or a combination comprising at least one of the foregoing. Combinations of low polarity polymers with higher polarity polymers can also be used, non-limiting examples including epoxy and poly(phenylene ether), epoxy and poly(etherimide), cyanate ester and poly(phenylene ether), and 1,2-polybutadiene and polyethylene.

Fluoropolymers include fluorinated homopolymers, e.g., PTFE and polychlorotrifluoroethylene (PCTFE), and fluorinated copolymers, e.g. copolymers of tetrafluoroethylene or chlorotrifluoroethylene with a monomer such as hexafluoropropylene or perfluoroalkylvinylethers, vinylidene fluoride, vinyl fluoride, ethylene, or a combination comprising at least one of the foregoing. The fluoropolymer can comprise a combination of different at least one these fluoropolymers.

The polymer matrix can comprise thermosetting polybutadiene or polyisoprene. As used herein, the term "thermosetting polybutadiene or polyisoprene" includes homopolymers and copolymers comprising units derived from butadiene, isoprene, or combinations thereof. Units derived from other copolymerizable monomers can also be present in the polymer, for example, in the form of grafts. Exemplary copolymerizable monomers include, but are not limited to, vinylaromatic monomers, for example substituted and unsubstituted monovinylaromatic monomers such as styrene, 3-methylstyrene, 3,5-diethylstyrene, 4-n-propylstyrene, alpha-methylstyrene, alpha-methyl vinyltoluene, para-hydroxystyrene, para-methoxystyrene, alpha-chlorostyrene, alpha-bromostyrene, dichlorostyrene, dibromostyrene, tetra-chlorostyrene, and the like; and substituted and unsubstituted divinylaromatic monomers such as divinylbenzene, divinyltoluene, and the like. Combinations comprising at least one of the foregoing copolymerizable monomers can also be used. Exemplary thermosetting polybutadiene or polyisoprenes include, but are not limited to, butadiene homopolymers, isoprene homopolymers, butadiene-vinylaromatic copolymers such as butadiene-styrene, isoprene-vinylaromatic copolymers such as isoprene-styrene copolymers, and the like.

The thermosetting polybutadiene or polyisoprenes can also be modified. For example, the polymers can be hydroxyl-terminated, methacrylate-terminated, carboxylate-terminated, or the like. Post-reacted polymers can be used, such as epoxy-, maleic anhydride-, or urethane-modified polymers of butadiene or isoprene polymers. The polymers can also be crosslinked, for example by divinylaromatic compounds such as divinyl benzene, e.g., a polybutadiene-styrene crosslinked with divinyl benzene. Exemplary materials are broadly classified as "polybutadienes" by their manufacturers, for example, Nippon Soda Co., Tokyo, Japan, and Cray Valley Hydrocarbon Specialty Chemicals, Exton, PA Combinations can also be used, for example, a combination of a polybutadiene homopolymer and a poly (butadiene-isoprene) copolymer. Combinations comprising a syndiotactic polybutadiene can also be useful.

The thermosetting polybutadiene or polyisoprene can be liquid or solid at room temperature. The liquid polymer can have a number average molecular weight (Mn) of greater than or equal to 5,000 g/mol. The liquid polymer can have an Mn of less than 5,000 g/mol, specifically, 1,000 to 3,000 g/mol. Thermosetting polybutadiene or polyisoprenes having at least 90 wt % 1,2 addition, which can exhibit greater crosslink density upon cure due to the large number of pendent vinyl groups available for crosslinking.

The polybutadiene or polyisoprene can be present in the polymer composition in an amount of up to 100 wt %, specifically, up to 75 wt % with respect to the total polymer matrix composition, more specifically, 10 to 70 wt %, even more specifically, 20 to 60 or 70 wt %, based on the total polymer matrix composition.

Other polymers that can co-cure with the thermosetting polybutadiene or polyisoprenes can be added for specific property or processing modifications. For example, in order to improve the stability of the dielectric strength and mechanical properties of the dielectric material over time, a lower molecular weight ethylene-propylene elastomer can be used in the systems. An ethylene-propylene elastomer as used herein is a copolymer, terpolymer, or other polymer comprising primarily ethylene and propylene. Ethylene-propylene elastomers can be further classified as EPM copolymers (i.e., copolymers of ethylene and propylene monomers) or EPDM terpolymers (i.e., terpolymers of ethylene, propylene, and diene monomers). Ethylene-propylene-diene terpolymer rubbers, in particular, have saturated main chains, with unsaturation available off the main chain for facile cross-linking. Liquid ethylene-propylene-diene terpolymer rubbers, in which the diene is dicyclopentadiene, can be used.

The molecular weights of the ethylene-propylene rubbers can be less than 10,000 g/mol viscosity average molecular weight (Mv). The ethylene-propylene rubber can include an ethylene-propylene rubber having an Mv of 7,200 g/mol, which is available from Lion Copolymer, Baton Rouge, LA, under the trade name TRILENE™ CP80; a liquid ethylene-propylene-dicyclopentadiene terpolymer rubbers having an Mv of 7,000 g/mol, which is available from Lion Copolymer under the trade name of TRILENE™ 65; and a liquid ethylene-propylene-ethylidene norbornene terpolymer having an Mv of 7,500 g/mol, which is available from Lion Copolymer under the name TRILENE™ 67.

The ethylene-propylene rubber can be present in an amount effective to maintain the stability of the properties of the dielectric material over time, in particular the dielectric strength and mechanical properties. Typically, such amounts are up to 20 wt % with respect to the total weight of the polymer matrix composition, specifically, 4 to 20 wt %, more specifically, 6 to 12 wt %.

Another type of co-curable polymer is an unsaturated polybutadiene- or polyisoprene-containing elastomer. This component can be a random or block copolymer of primarily 1,3-addition butadiene or isoprene with an ethylenically unsaturated monomer, for example, a vinylaromatic compound such as styrene or alpha-methyl styrene, an acrylate or methacrylate such a methyl methacrylate, or acrylonitrile. The elastomer can be a solid, thermoplastic elastomer comprising a linear or graft-type block copolymer having a polybutadiene or polyisoprene block and a thermoplastic block that can be derived from a monovinylaromatic monomer such as styrene or alpha-methyl styrene. Block copolymers of this type include styrene-butadiene-styrene triblock copolymers, for example, those available from Dexco Polymers, Houston, TX under the trade name VECTOR 8508M™, from Enichem Elastomers America, Houston, TX under the trade name SOL-T-6302™, and those from Dynasol Elastomers under the trade name CALPRENE™ 401; and styrene-butadiene diblock copolymers and mixed triblock and diblock copolymers containing styrene and butadiene, for example, those available from Kraton Polymers (Houston, TX) under the trade name KRATON D1118. KRATON D1118 is a mixed diblock/triblock styrene and butadiene containing copolymer that contains 33 wt % styrene.

The optional polybutadiene- or polyisoprene-containing elastomer can further comprise a second block copolymer similar to that described above, except that the polybutadiene or polyisoprene block is hydrogenated, thereby forming a polyethylene block (in the case of polybutadiene) or an ethylene-propylene copolymer block (in the case of polyisoprene). When used in conjunction with the above-described copolymer, materials with greater toughness can be produced. An exemplary second block copolymer of this type is KRATON GX1855 (commercially available from Kraton Polymers, which is believed to be a combination of a styrene-high 1,2-butadiene-styrene block copolymer and a styrene-(ethylene-propylene)-styrene block copolymer.

The unsaturated polybutadiene- or polyisoprene-containing elastomer component can be present in the polymer matrix composition in an amount of 2 to 60 wt % with respect to the total weight of the polymer matrix composition, specifically, 5 to 50 wt %, more specifically, 10 to 40 or 50 wt %.

Still other co-curable polymers that can be added for specific property or processing modifications include, but are not limited to, homopolymers or copolymers of ethylene such as polyethylene and ethylene oxide copolymers; natural rubber; norbornene polymers such as polydicyclopentadiene; hydrogenated styrene-isoprene-styrene copolymers and butadiene-acrylonitrile copolymers; unsaturated polyesters; and the like. Levels of these copolymers are generally less than 50 wt % of the total polymer in the polymer matrix composition.

Free radical-curable monomers can also be added for specific property or processing modifications, for example to increase the crosslink density of the system after cure. Exemplary monomers that can be suitable crosslinking agents include, for example, di, tri-, or higher ethylenically unsaturated monomers such as divinyl benzene, triallyl cyanurate, diallyl phthalate, and multifunctional acrylate monomers (e.g., SARTOMER™ polymers available from Sartomer USA, Newtown Square, PA), or combinations thereof, all of which are commercially available. The crosslinking agent, when used, can be present in the polymer matrix composition in an amount of up to 20 wt %, specifically, 1 to 15 wt %, based on the total weight of the total polymer in the polymer matrix composition.

A curing agent can be added to the polymer matrix composition to accelerate the curing reaction of polyenes having olefinic reactive sites. Curing agents can comprise organic peroxides, for example, dicumyl peroxide, t-butyl perbenzoate, 2,5-dimethyl-2,5-di(t-butyl peroxy)hexane, α,α-di-bis(t-butyl peroxy)diisopropylbenzene, 2,5-dimethyl-2,5-di(t-butyl peroxy) hexyne-3, or a combination comprising at least one of the foregoing. Carbon-carbon initiators, for example, 2,3-dimethyl-2,3 diphenylbutane can be used. Curing agents or initiators can be used alone or in combination. The amount of curing agent can be 1.5 to 10 wt % based on the total weight of the polymer in the polymer matrix composition.

In some embodiments, the polybutadiene or polyisoprene polymer is carboxy-functionalized. Functionalization can be accomplished using a polyfunctional compound having in the molecule both (i) a carbon-carbon double bond or a carbon-carbon triple bond, and (ii) at least one of a carboxy group, including a carboxylic acid, anhydride, amide, ester, or acid halide. A specific carboxy group is a carboxylic acid or ester. Examples of polyfunctional compounds that can provide a carboxylic acid functional group include maleic acid, maleic anhydride, fumaric acid, and citric acid. In particular, polybutadienes adducted with maleic anhydride can be used in the thermosetting composition. Suitable maleinized polybutadiene polymers are commercially available, for example from Cray Valley under the trade names RICON 130MA8, RICON 130MA13, RICON 130MA20, RICON 131MA5, RICON 131MA10, RICON 131MA17, RICON 131MA20, and RICON 156MA17. Suitable maleinized polybutadiene-styrene copolymers are commercially available, for example, from Sartomer under the trade names RICON 184MA6. RICON 184MA6 is a butadiene-styrene copolymer adducted with maleic anhydride having styrene content of 17 to 27 wt % and Mn of 9,900 g/mol.

The relative amounts of the various polymers in the polymer matrix composition, for example, the polybutadiene or polyisoprene polymer and other polymers, can depend on the particular conductive metal ground plate layer used, the desired properties of the circuit materials, and like considerations. For example, use of a poly(arylene ether) can provide increased bond strength to a conductive metal component, for example, a copper or aluminum component such as a signal feed, ground, or reflector component. Use of a polybutadiene or polyisoprene polymer can increase high temperature resistance of the composites, for example, when these polymers are carboxy-functionalized. Use of an elastomeric block copolymer can function to compatibilize the components of the polymer matrix material. Determination of the appropriate quantities of each component can be done without undue experimentation, depending on the desired properties for a particular application.

The dielectric volume can further include a particulate dielectric filler selected to adjust the dielectric constant, dissipation factor, coefficient of thermal expansion, and other properties of the dielectric volume. The dielectric filler can comprise, for example, titanium dioxide (rutile and anatase), barium titanate, strontium titanate, silica (including fused amorphous silica), corundum, wollastonite, $Ba_2Ti_9O_{20}$, solid glass spheres, synthetic glass or ceramic hollow spheres, quartz, boron nitride, aluminum nitride, silicon carbide, beryllia, alumina, alumina trihydrate, magnesia, mica, talcs, nanoclays, magnesium hydroxide, or a combination comprising at least one of the foregoing. A single secondary filler, or a combination of secondary fillers, can be used to provide a desired balance of properties.

Optionally, the fillers can be surface treated with a silicon-containing coating, for example, an organofunctional alkoxy silane coupling agent. A zirconate or titanate coupling agent can be used. Such coupling agents can improve the dispersion of the filler in the polymeric matrix and reduce water absorption of the finished DRA. The filler component can comprise 5 to 50 vol % of the microspheres and 70 to 30 vol % of fused amorphous silica as secondary filler based on the weight of the filler.

The dielectric volume can also optionally contain a flame retardant useful for making the volume resistant to flame. These flame retardant can be halogenated or unhalogenated. The flame retardant can be present in in the dielectric volume in an amount of 0 to 30 vol % based on the volume of the dielectric volume.

In an embodiment, the flame retardant is inorganic and is present in the form of particles. An exemplary inorganic flame retardant is a metal hydrate, having, for example, a volume average particle diameter of 1 nm to 500 nm, preferably 1 to 200 nm, or 5 to 200 nm, or 10 to 200 nm; alternatively the volume average particle diameter is 500 nm to 15 micrometer, for example 1 to 5 micrometer. The metal hydrate is a hydrate of a metal such as Mg, Ca, Al, Fe, Zn, Ba, Cu, Ni, or a combination comprising at least one of the foregoing. Hydrates of Mg, Al, or Ca are particularly preferred, for example aluminum hydroxide, magnesium hydroxide, calcium hydroxide, iron hydroxide, zinc hydroxide, copper hydroxide and nickel hydroxide; and hydrates of calcium aluminate, gypsum dihydrate, zinc borate and barium metaborate. Composites of these hydrates can be used, for example a hydrate containing Mg and one or more of Ca, Al, Fe, Zn, Ba, Cu and Ni. A preferred composite metal hydrate has the formula $MgMx\cdot(OH)_y$, wherein M is Ca, Al, Fe, Zn, Ba, Cu, or Ni, x is 0.1 to 10, and y is from 2 to 32. The flame retardant particles can be coated or otherwise treated to improve dispersion and other properties.

Organic flame retardants can be used, alternatively or in addition to the inorganic flame retardants. Examples of inorganic flame retardants include melamine cyanurate, fine particle size melamine polyphosphate, various other phosphorus-containing compounds such as aromatic phosphinates, diphosphinates, phosphonates, and phosphates, certain polysilsesquioxanes, siloxanes, and halogenated compounds such as hexachloroendomethylenetetrahydrophthalic acid (HET acid), tetrabromophthalic acid and dibromoneopentyl glycol A flame retardant (such as a bromine-containing flame retardant) can be present in an amount of 20 phr (parts per hundred parts of resin) to 60 phr, specifically, 30 to 45 phr. Examples of brominated flame retardants include Saytex BT93W (ethylene bistetrabromophthalimide), Saytex 120 (tetradecabromodiphenoxy benzene), and Saytex 102 (decabromodiphenyl oxide). The flame retardant can be used in combination with a synergist, for example a halogenated flame retardant can be used in combination with a synergists such as antimony trioxide, and a phosphorus-containing flame retardant can be used in combination with a nitrogen-containing compound such as melamine.

The volume of dielectric material may be formed from a dielectric composition comprising the polymer matrix composition and the filler composition. The volume can be formed by casting a dielectric composition directly onto the ground structure layer, or a dielectric volume can be produced that can be deposited onto the ground structure layer. The method to produce the dielectric volume can be based on the polymer selected. For example, where the polymer comprises a fluoropolymer such as PTFE, the polymer can be mixed with a first carrier liquid. The combination can comprise a dispersion of polymeric particles in the first carrier liquid, e.g., an emulsion of liquid droplets of the polymer or of a monomeric or oligomeric precursor of the polymer in the first carrier liquid, or a solution of the polymer in the first carrier liquid. If the polymer is liquid, then no first carrier liquid may be necessary.

The choice of the first carrier liquid, if present, can be based on the particular polymeric and the form in which the polymeric is to be introduced to the dielectric volume. If it is desired to introduce the polymeric as a solution, a solvent for the particular polymer is chosen as the carrier liquid, e.g., N-methyl pyrrolidone (NMP) would be a suitable carrier liquid for a solution of a polyimide. If it is desired to introduce the polymer as a dispersion, then the carrier liquid can comprise a liquid in which the is not soluble, e.g., water would be a suitable carrier liquid for a dispersion of PTFE particles and would be a suitable carrier liquid for an emulsion of polyamic acid or an emulsion of butadiene monomer.

The dielectric filler component can optionally be dispersed in a second carrier liquid, or mixed with the first carrier liquid (or liquid polymer where no first carrier is used). The second carrier liquid can be the same liquid or can be a liquid other than the first carrier liquid that is miscible with the first carrier liquid. For example, if the first carrier liquid is water, the second carrier liquid can comprise water or an alcohol. The second carrier liquid can comprise water.

The filler dispersion can comprise a surfactant in an amount effective to modify the surface tension of the second carrier liquid to enable the second carrier liquid to wet the borosilicate microspheres. Exemplary surfactant compounds include ionic surfactants and nonionic surfactants. TRITON X-100™, has been found to be an exemplary surfactant for use in aqueous filler dispersions. The filler dispersion can comprise 10 to 70 vol % of filler and 0.1 to 10 vol % of surfactant, with the remainder comprising the second carrier liquid.

The combination of the polymer and first carrier liquid and the filler dispersion in the second carrier liquid can be combined to form a casting mixture. In an embodiment, the casting mixture comprises 10 to 60 vol % of the combined polymer and filler and 40 to 90 vol % combined first and second carrier liquids. The relative amounts of the polymer and the filler component in the casting mixture can be selected to provide the desired amounts in the final composition as described below.

The viscosity of the casting mixture can be adjusted by the addition of a viscosity modifier, selected on the basis of its compatibility in a particular carrier liquid or combination of carrier liquids, to retard separation, i.e. sedimentation or flotation, of the hollow sphere filler from the dielectric composite material and to provide a dielectric composite material having a viscosity compatible with conventional manufacturing equipment. Exemplary viscosity modifiers suitable for use in aqueous casting mixtures include, e.g., polyacrylic acid compounds, vegetable gums, and cellulose based compounds. Specific examples of suitable viscosity modifiers include polyacrylic acid, methyl cellulose, polyethyleneoxide, guar gum, locust bean gum, sodium carboxymethylcellulose, sodium alginate, and gum tragacanth. The viscosity of the viscosity-adjusted casting mixture can be further increased, i.e., beyond the minimum viscosity, on an application by application basis to adapt the dielectric composite material to the selected manufacturing technique. In an embodiment, the viscosity-adjusted casting mixture can exhibit a viscosity of 10 to 100,000 centipoise (cp); specifically, 100 cp and 10,000 cp measured at room temperature value.

Alternatively, the viscosity modifier can be omitted if the viscosity of the carrier liquid is sufficient to provide a casting mixture that does not separate during the time period of interest. Specifically, in the case of extremely small particles, e.g., particles having an equivalent spherical diameter less than 0.1 micrometers, the use of a viscosity modifier may not be necessary.

A layer of the viscosity-adjusted casting mixture can be cast onto the ground structure layer, or can be dip-coated and then shaped. The casting can be achieved by, for example, dip coating, flow coating, reverse roll coating, knife-over-roll, knife-over-plate, metering rod coating, and the like.

The carrier liquid and processing aids, i.e., the surfactant and viscosity modifier, can be removed from the cast volume, for example, by evaporation or by thermal decomposition in order to consolidate a dielectric volume of the polymer and the filler comprising the microspheres.

The volume of the polymeric matrix material and filler component can be further heated to modify the physical properties of the volume, e.g., to sinter a thermoplastic or to cure or post cure a thermosetting composition.

In another method, a PTFE composite dielectric volume can be made by a paste extrusion and calendaring process.

In still another embodiment, the dielectric volume can be cast and then partially cured ("B-staged"). Such B-staged volumes can be stored and used subsequently.

An adhesion layer can be disposed between the conductive ground layer and the dielectric volume. The adhesion layer can comprise a poly(arylene ether); and a carboxy-functionalized polybutadiene or polyisoprene polymer comprising butadiene, isoprene, or butadiene and isoprene units, and zero to less than or equal to 50 wt % of co-curable monomer units; wherein the composition of the adhesive layer is not the same as the composition of the dielectric volume. The adhesive layer can be present in an amount of 2 to 15 grams per square meter. The poly(arylene ether) can comprise a carboxy-functionalized poly(arylene ether). The poly(arylene ether) can be the reaction product of a poly (arylene ether) and a cyclic anhydride or the reaction product of a poly(arylene ether) and maleic anhydride. The carboxy-functionalized polybutadiene or polyisoprene polymer can be a carboxy-functionalized butadiene-styrene copolymer. The carboxy-functionalized polybutadiene or polyisoprene polymer can be the reaction product of a polybutadiene or polyisoprene polymer and a cyclic anhydride. The carboxy-functionalized polybutadiene or polyisoprene polymer can be a maleinized polybutadiene-styrene or maleinized polyisoprene-styrene copolymer.

In an embodiment, a multiple-step process suitable for thermosetting materials such as polybutadiene or polyisoprene can comprise a peroxide cure step at temperatures of 150 to 200° C., and the partially cured (B-staged) stack can then be subjected to a high-energy electron beam irradiation cure (E-beam cure) or a high temperature cure step under an inert atmosphere. Use of a two-stage cure can impart an unusually high degree of cross-linking to the resulting composite. The temperature used in the second stage can be 250 to 300° C., or the decomposition temperature of the polymer. This high temperature cure can be carried out in an oven but can also be performed in a press, namely as a continuation of the initial fabrication and cure step. Particular fabrication temperatures and pressures will depend upon the particular adhesive composition and the dielectric composition, and are readily ascertainable by one of ordinary skill in the art without undue experimentation.

Molding allows rapid and efficient manufacture of the dielectric volume, optionally together with another DRA component(s) as an embedded feature or a surface feature. For example, a metal, ceramic, or other insert can be placed in the mold to provide a component of the DRA, such as a signal feed, ground component, or reflector component as embedded or surface feature. Alternatively, an embedded feature can be 3D printed or inkjet printed onto a volume, followed by further molding; or a surface feature can be 3D printed or inkjet printed onto an outermost surface of the DRA. It is also possible to mold the volume directly onto the ground structure, or into a container comprising a material having a dielectric constant between 1 and 3.

The mold can have a mold insert comprising a molded or machined ceramic to provide the package or volume. Use of a ceramic insert can lead to lower loss resulting in higher efficiency; reduced cost due to low direct material cost for molded alumina; ease of manufactured and controlled (constrained) thermal expansion of the polymer. It can also provide a balanced coefficient of thermal expansion (CTE) such that the overall structure matches the CTE of copper or aluminum.

The injectable composition can be prepared by first combining the ceramic filler and the silane to form a filler composition and then mixing the filler composition with the thermoplastic polymer or thermosetting composition. For a thermoplastic polymer, the polymer can be melted prior to, after, or during the mixing with one or both of the ceramic filler and the silane. The injectable composition can then be injection molded in a mold. The melt temperature, the injection temperature, and the mold temperature used depend on the melt and glass transition temperature of the thermoplastic polymer, and can be, for example, 150 to 350° C., or 200 to 300° C. The molding can occur at a pressure of 65 to 350 kiloPascal (kPa).

In some embodiments, the dielectric volume can be prepared by reaction injection molding a thermosetting composition. The reaction injection molding can comprise mixing at least two streams to form a thermosetting composition, and injecting the thermosetting composition into the mold, wherein a first stream comprises the catalyst and the second stream optionally comprises an activating agent. One or both of the first stream and the second stream or a third stream can comprise a monomer or a curable composition. One or both of the first stream and the second stream or a third stream can comprise one or both of a dielectric filler and an additive. One or both of the dielectric filler and the additive can be added to the mold prior to injecting the thermosetting composition.

For example, a method of preparing the volume can comprise mixing a first stream comprising the catalyst and a first monomer or curable composition and a second stream comprising the optional activating agent and a second monomer or curable composition. The first and second monomer or curable composition can be the same or different. One or both of the first stream and the second stream can comprise the dielectric filler. The dielectric filler can be added as a third stream, for example, further comprising a third monomer. The dielectric filler can be in the mold prior to injection of the first and second streams. The introducing of one or more of the streams can occur under an inert gas, for example, nitrogen or argon.

The mixing can occur in a head space of an injection molding machine, or in an inline mixer, or during injecting into the mold. The mixing can occur at a temperature of greater than or equal to 0 to 200 degrees Celsius (° C.), specifically, 15 to 130° C., or 0 to 45° C., more specifically, 23 to 45° C.

The mold can be maintained at a temperature of greater than or equal to 0 to 250° C., specifically, 23 to 200° C. or 45 to 250° C., more specifically, 30 to 130° C. or 50 to 70° C. It can take 0.25 to 0.5 minutes to fill a mold, during which time, the mold temperature can drop. After the mold is filled, the temperature of the thermosetting composition can increase, for example, from a first temperature of 0° to 45° C. to a second temperature of 45 to 250° C. The molding can occur at a pressure of 65 to 350 kiloPascal (kPa). The molding can occur for less than or equal to 5 minutes, specifically, less than or equal to 2 minutes, more specifically, 2 to 30 seconds. After the polymerization is complete, the substrate can be removed at the mold temperature or at a decreased mold temperature. For example, the release temperature, $T_r$, can be less than or equal to 10° C. less than the molding temperature, $T_m$ ($T_r \leq T_m - 10°$ C.).

After the volume is removed from the mold, it can be post-cured. Post-curing can occur at a temperature of 100 to 150° C., specifically, 140 to 200° C. for greater than or equal to 5 minutes.

Compression molding can be used with either thermoplastic or thermosetting materials. Conditions for compression molding a thermoplastic material, such as mold temperature, depend on the melt and glass transition temperature of the thermoplastic polymer, and can be, for example, 150 to 350° C., or 200 to 300° C. The molding can occur at a pressure of 65 to 350 kiloPascal (kPa). The molding can occur for less than or equal to 5 minutes, specifically, less than or equal to 2 minutes, more specifically, 2 to 30 seconds. A thermosetting material can be compression molded before B-staging to produce a B-stated material or a fully cured material; or it can be compression molded after it has been B-staged, and fully cured in the mold or after molding.

3D printing allows rapid and efficient manufacture of the dielectric volume, optionally together with another DRA component(s) as an embedded feature or a surface feature. For example, a metal, ceramic, or other insert can be placed during printing provide a component of the DRA, such as a signal feed, ground component, or reflector component as embedded or surface feature. Alternatively, an embedded feature can be 3D printed or inkjet printed onto a volume, followed by further printing; or a surface feature can be 3D printed or inkjet printed onto an outermost surface of the DRA. It is also possible to 3D print the volume directly onto the ground structure, or into the container comprising a material having a dielectric constant between 1 and 3, where the container may be useful for embedding a unit cells of an array.

A wide variety of 3D printing methods can be used, for example fused deposition modeling (FDM), selective laser sintering (SLS), selective laser melting (SLM), electronic beam melting (EBM), Big Area Additive Manufacturing (BAAM), ARBURG plastic free forming technology, laminated object manufacturing (LOM), pumped deposition (also known as controlled paste extrusion, as described, for example, at: http://nscrypt.com/micro-dispensing), or other 3D printing methods. 3D printing can be used in the manufacture of prototypes or as a production process. In some embodiments the volume or the DRA is manufactured only by 3D or inkjet printing, such that the method of forming the dielectric volume or the DRA is free of an extrusion, molding, or lamination process.

Material extrusion techniques are particularly useful with thermoplastics, and can be used to provide intricate features. Material extrusion techniques include techniques such as FDM, pumped deposition, and fused filament fabrication, as well as others as described in ASTM F2792-12a. In fused material extrusion techniques, an article can be produced by heating a thermoplastic material to a flowable state that can be deposited to form a layer. The layer can have a predetermined shape in the x-y axis and a predetermined thickness in the z-axis. The flowable material can be deposited as roads as described above, or through a die to provide a specific profile. The layer cools and solidifies as it is deposited. A subsequent layer of melted thermoplastic material fuses to the previously deposited layer, and solidifies upon a drop in temperature. Extrusion of multiple subsequent layers builds the desired shape of the volume. In particular, an article can be formed from a three-dimensional digital representation of the article by depositing the flowable material as one or more roads on a substrate in an x-y plane to form the layer. The position of the dispenser (e.g., a nozzle) relative to the substrate is then incremented along a z-axis (perpendicular to the x-y plane), and the process is then repeated to form an article from the digital representation. The dispensed material is thus also referred to as a "modeling material" as well as a "build material."

In some embodiments the volume may be extruded from two or more nozzles, each extruding the same dielectric composition. If multiple nozzles are used, the method can produce the product objects faster than methods that use a single nozzle, and can allow increased flexibility in terms of using different polymers or blends of polymers, different colors, or textures, and the like. Accordingly, in an embodiment, a composition or property of a single volume can be varied during deposition using two nozzles.

Material extrusion techniques can further be used of the deposition of thermosetting compositions. For example, at least two streams can be mixed and deposited to form the volume. A first stream can include catalyst and a second stream can optionally comprise an activating agent. One or both of the first stream and the second stream or a third stream can comprise the monomer or curable composition (e.g., resin). One or both of the first stream and the second stream or a third stream can comprise one or both of a dielectric filler and an additive. One or both of the dielectric filler and the additive can be added to the mold prior to injecting the thermosetting composition.

For example, a method of preparing the volume can comprise mixing a first stream comprising the catalyst and a first monomer or curable composition and a second stream comprising the optional activating agent and a second monomer or curable composition. The first and second monomer or curable composition can be the same or different. One or both of the first stream and the second stream can comprise the dielectric filler. The dielectric filler can be added as a third stream, for example, further comprising a third monomer. The depositing of one or more of the streams can occur under an inert gas, for example, nitrogen or argon. The mixing can occur prior to deposition, in an inline mixer, or during deposition of the layer. Full or partial curing (polymerization or crosslinking) can be initiated prior to deposition, during deposition of the layer, or after deposition. In an embodiment, partial curing is initiated prior to or during deposition of the layer, and full curing is initiated after deposition of the layer or after deposition of the plurality of layers that provides the volume.

In some embodiments a support material as is known in the art can optionally be used to form a support structure. In these embodiments, the build material and the support material can be selectively dispensed during manufacture of the article to provide the article and a support structure. The support material can be present in the form of a support structure, for example a scaffolding that can be mechanically removed or washed away when the layering process is completed to the desired degree.

Stereolithographic techniques can also be used, such as selective laser sintering (SLS), selective laser melting (SLM), electronic beam melting (EBM), and powder bed jetting of binder or solvents to form successive layers in a preset pattern. Stereolithographic techniques are especially useful with thermosetting compositions, as the layer-by-layer buildup can occur by polymerizing or crosslinking each layer.

As described above, the dielectric composition can comprise a thermoplastic polymer or a thermosetting composition. The thermoplastic can be melted, or dissolved in a suitable solvent. The thermosetting composition can be a liquid thermosetting composition, or dissolved in a solvent. The solvent can be removed after applying the dielectric composition by heat, air drying, or other technique. The thermosetting composition can be B-staged, or fully polymerized or cured after applying to form the second volume. Polymerization or cure can be initiated during applying the dielectric composition.

While the invention has been described with reference to exemplary embodiments, it will be understood by those skilled in the art that various changes may be made and equivalents may be substituted for elements thereof without departing from the scope of the claims. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments and, although specific terms and/or dimensions may have been employed, they are unless otherwise stated used in a generic, exemplary and/or descriptive sense only and not for purposes of limitation, the scope of the claims therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item. Additionally, the term "comprising" as used herein does not exclude the possible inclusion of one or more additional features.

The invention claimed is:

1. An electromagnetic device, comprising:

an electromagnetically reflective structure comprising an electrically conductive structure and a plurality of electrically conductive electromagnetic reflectors that are integrally formed with or are in electrical communication with the electrically conductive structure;

wherein the plurality of electrically conductive electromagnetic reflectors are disposed relative to each other in an ordered arrangement;

wherein each reflector of the plurality of electrically conductive electromagnetic reflectors forms an electrically conductive wall that defines and at least partially circumscribes a recess having an electrically conductive base that forms part of or is in electrical communication with the electrically conductive structure;

wherein the electrically conductive structure is configured to provide an electrical ground reference voltage of the electromagnetic device;

wherein each electrically conductive base of the plurality of reflectors and each electrically conductive wall of the plurality of reflectors are in direct electrical connection with the electrical ground reference voltage; and further comprising a dielectric resonator antenna (DRA) disposed at least partially within a respective recess of an associated reflector of the plurality of electrically conductive electromagnetic reflectors, each respective DRA being disposed on an associated electrically conductive base;

wherein each respective DRA is any one of; a one-piece solid DRA, a hollow air core DRA, or a multi-layered DRA having dielectric layers with different dielectric constants.

2. The device of claim 1, wherein the associated DRA is operational at a defined frequency f with an associated operating wavelength λ in free space, and wherein the plurality of electrically conductive electromagnetic reflectors are arranged in an array with a center-to-center spacing between neighboring reflectors in accordance with any of the following arrangements:

spaced apart relative to each other with a spacing of equal to or less than λ;

spaced apart relative to each other with a spacing equal to or less than λ, and equal to or greater than λ/2; or, spaced apart relative to each other with a spacing equal to or less than λ/2.

3. The device of claim 1, wherein:

the electromagnetically reflective structure is a monolithic structure formed from a single material absent macroscopic seams or joints.

4. The device of claim 1, wherein:

the electromagnetically reflective structure comprises a combination of a non-metallic portion and a metallic coating over at least a portion of the non-metallic portion, the combination forming the electrically conductive structure and the plurality of electrically conductive electromagnetic reflectors.

5. The device of claim 4, wherein the electrically conductive base comprises an aperture configured to receive an electromagnetic signal.

6. The device of claim 4, wherein the non-metallic portion comprises a polymer.

7. The device of claim 4, wherein the non-metallic portion comprises a thermoplastic.

8. The device of claim 4, wherein the non-metallic portion comprises a thermoset.

9. The device of claim 4, wherein the non-metallic portion comprises a polymer laminate.

10. The device of claim 9, wherein the polymer laminate includes one or more drilled holes.

11. The device of claim 4, wherein the non-metallic portion comprise a molded polymer.

12. The device of claim 11, wherein the molded polymer comprises an injection molded polymer.

13. The device of claim 4, wherein the metallic coating comprises a plated metallic coating.

14. The device of claim 13, wherein the metallic coating comprises an electroplated metallic coating.

15. The device of claim 14, wherein the metallic coating comprises an electroless plated metallic coating.

16. The device of claim 4, wherein the metallic coating comprises a vapor deposited metallic coating.

17. The device of claim 16, wherein the metallic coating comprises a physical vapor deposited metallic coating.

18. The device of claim 4, wherein:

each one of the plurality of electrically conductive electromagnetic reflectors is of like structure, each reflector of the plurality of electrically conductive electromagnetic reflectors being arranged in an array with a center-to-center spacing between neighboring ones of the plurality of electrically conductive electromagnetic reflectors in accordance with any of the following arrangements:

equally spaced apart relative to each other in an x-y grid formation;

spaced apart in a diamond formation;

spaced apart relative to each other in a uniform periodic pattern;

spaced apart relative to each other in an increasing or decreasing non-periodic pattern;

spaced apart relative to each other on an oblique grid in a uniform periodic pattern;

spaced apart relative to each other on a radial grid in a uniform periodic pattern;

spaced apart relative to each other on an x-y grid in an increasing or decreasing non-periodic pattern;

spaced apart relative to each other on an oblique grid in an increasing or decreasing non-periodic pattern;

spaced apart relative to each other on a radial grid in an increasing or decreasing non-periodic pattern;

spaced apart relative to each other on a non-x-y grid in a uniform periodic pattern; or spaced apart relative to each other on a non-x-y grid in an increasing or decreasing non-periodic pattern.

19. The device of claim 1, wherein:

each respective DRA is disposed on the electrically conductive.

* * * * *